(12) United States Patent  
Kim et al.

(10) Patent No.: US 7,936,420 B2  
(45) Date of Patent: May 3, 2011

(54) LIGHT GUIDING AND DISPERSING PLATE AND DISPLAY DEVICE HAVING THE SAME

(75) Inventors: Hyoung-joo Kim, Uiwang-si (KR); Jae-joong Kwon, Suwon-si (KR); Seung-in Baek, Seoul (KR); Sung-kyu Shim, Seoul (KR); Sung-wook Kang, Seoul (KR); Jun-young Lee, Yongin-si (KR); In-sun Hwang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 215 days.

(21) Appl. No.: 12/220,776

(22) Filed: Jul. 28, 2008

(65) Prior Publication Data

US 2009/0122229 A1 May 14, 2009

(30) Foreign Application Priority Data

Nov. 12, 2007 (KR) .................. 10-2007-0114992

(51) Int. Cl.
*G02F 1/1335* (2006.01)
(52) U.S. Cl. ........................................................ 349/65
(58) Field of Classification Search .................. None
See application file for complete search history.

(56) References Cited

U.S. PATENT DOCUMENTS

| 7,510,308 | B2 * | 3/2009 | Goto | 362/330 |
| 7,591,580 | B2 * | 9/2009 | Maeda et al. | 362/625 |
| 7,663,713 | B2 * | 2/2010 | Saito et al. | 349/65 |
| 2004/0264911 | A1 * | 12/2004 | Toeda et al. | 385/146 |

FOREIGN PATENT DOCUMENTS

| JP | 09-061631 | 3/1997 |
| JP | 10-260315 | 9/1998 |
| KR | 10-0663297 | 12/2006 |

* cited by examiner

*Primary Examiner* — Sung H Pak
(74) *Attorney, Agent, or Firm* — Innovation Counsel LLP

(57) ABSTRACT

A monolithic light guiding and dispersing plate is provided in a backlighted display panel for receiving input light from one or more edge sources and for guiding the received light throughout the plate for substantially uniform reflection upwardly and substantially uniform dispersal toward an image forming plane located above the light guiding and dispersing plate. In one embodiment, the light guiding and dispersing plate has a light receiving surface upon which the light generated by an edge light source is incident, a top major surface which is adjacent to the light receiving surface and on which a plurality of first protrusions are formed and elongated in a first direction, wherein the first protrusions have cross-sections in the shapes of partial ellipses. The plate further has a bottom major surface in which light reflecting recesses are defined to reflect light upwardly towards the top major surface.

32 Claims, 21 Drawing Sheets (A)

LIGHT GUIDING AND DISPERSING PLATE AND DISPLAY DEVICE HAVING THE SAME

CROSS-REFERENCE TO RELATED APPLICATION

This application claims priority from Korean Patent Application No. 10-2007-0114992 filed on Nov. 12, 2007 in the Korean Intellectual Property Office, the disclosure of which is incorporated herein by reference in its entirety.

BACKGROUND

1. Field of Invention

The present disclosure of invention relates to a light guiding and dispersing plate and a display device having the same, and more particularly, to a light guiding plate which can improve the luminance and the luminance uniformity of a display device (such as a liquid crystal display (LCD) device) equipped with a backlight assembly, and a display device having the light guiding plate.

2. Description of the Related Technology

Backlight assemblies, which are widely used in liquid crystal display (LCD) devices, are important elements that can affect the brightness and the external appearance of LCD devices. Backlight assemblies are classified into a direct-type backlight driven assembly and an edge-type driven backlight assembly where the latter includes an edge mounted light source, a light guiding plate that receives light from the edge mounted light source and various optical sheets such as a prism sheet, a diffusion sheet and a protection film. However, such backlight assemblies generally include a series of light transmitting mediums (e.g., layers) having different refractive indexes so that the interfaces between these mediums may cause a considerable amount of light loss since light passes through all the mediums and a portion can be refracted at each interface crossing. In addition, since backlight assemblies often include a number of separate optical sheets, it is relatively difficult to manage the assembly of such backlight assemblies, in which the manufacturing cost of the backlight assemblies is generally high due to the large number of separate parts and the overhead for handling each.

In particular, backlight assemblies using point type light sources such as light-emitting diodes (LED's), which has high luminance and high color representation capability, may result in a hot spot phenomenon in which the bright and dark portions (constructive reinforcement and destructive interference) both appear visible.

SUMMARY

Aspects of the present disclosure of invention include the provision of a light guiding plate which can provide appropriate optical properties for displaying an image and improve luminance uniformity without requiring optical sheets, and a display device having the light guiding plate. However, the aspects of the present disclosure are not to be restricted to the specific embodiments set forth herein.

According to an aspect of the present disclosure, there is provided a display device including a display panel; an edge mounted light source; and a monolithic light guiding and dispersing plate which guides light generated by the edge-mounted light source along parallel waveguides and redirects the guided light toward and disperses the redirected light to the display panel, where the light guiding plate comprises a light receiving surface upon which the light generated by the edge-mounted light source is incident, a first surface which is adjacent to the light receiving surface and on which a plurality of first protrusions (waveguides) are defined to extend longitudinally in a first direction parallel to one another, and a second surface which faces the first surface and in which a plurality of light reflecting structures (e.g., recesses) are formed. In one embodiment, the first protrusions have cross-sections in the shape of partial ellipses where the cross-sections are taken along a plane perpendicular to the first direction, and where each ellipse has a minor axis parallel to the first surface and a major axis perpendicular to the first surface.

The light guiding plate may also include a plurality of spacing portions which are interposed either regularly or periodically between the first protrusions and extend longitudinally in parallel with the first protrusions.

The spacing portions may have at least one of a flat surface, a protruding surface, and a recessed surface.

The spacing portions may have a cross-section of the shape of a partial circle along the plane perpendicular to the first direction.

The ellipse may have a minor axis radius a and a major axis radius and the circle may have a radius r, wherein the minor axis radius a and the radius r satisfy the following relation: $r<a$.

A height of the first protrusions from an imaginary horizontal surface may be greater than a height of the spacing portions from the imaginary horizontal surface.

One or more immediately adjacent first protrusions may be formed between a pair of successive spacing portions and one or more immediately adjacent spacing portions may be formed between a pair of successive first protrusions.

Spacing portions that are formed in the vicinity of the light receiving surface may have at least one of a protruding surface and a recessed surface and other spacing portions may have a flat surface.

The width of the spacing portions may be less than one fifth of the width of the first protrusions.

The ellipse may have a minor axis radius a and a major axis radius b, wherein the minor axis radius a and the major axis radius b satisfy the following relation: $1<b/a<4$.

The light guiding plate may also include a plurality of triangular protrusion patterns which are formed on the first surface and elongated in parallel with the first protrusions and have a cross-section of the shape of a triangular prism along a plane perpendicular to the first direction.

The first protrusions may be formed on portions of the first surface which are adjacent to either lateral surface of the light guiding plate that is perpendicular to the light receiving surface, the first surface and the second surface, and the triangular patterns may be formed between the first protrusions in parallel with the first protrusions.

The sum of the widths of first protrusions on one side of the light guiding plate may be two or more times greater than a thickness of the light guiding plate.

The triangular patterns and the first protrusions may be alternately arranged in parallel with each other.

The display panel may include a plurality of pixels and a pitch of the first protrusions may be less than or the same as a pitch of the pixels.

The display device may also include a prism sheet which is formed between the light guiding plate and the display panel and on which a plurality of prism patterns are formed, wherein a pitch of the first protrusions is less than or the same as a pitch of the prism patterns.

The light guiding plate may also include one or more light reflecting recesses which are interposed between second protrusions protruding from a bottom surface of the plate.

The second protrusions may extend in the same direction as the first protrusions in parallel with the first protrusions.

The light source may include point type light sources such as light emitting diodes.

According to another aspect of the present disclosure, there is provided a light guiding plate including a light receiving surface; a first surface which is adjacent to the light receiving surface and on which a plurality of first protrusions that extend in a direction perpendicular to the light receiving surface are formed; a second surface which faces the first surface and on which a plurality of second protrusions are formed, wherein the first protrusions have a cross-section of the shape of a partial ellipse along a plane parallel to the light receiving surface, the ellipse having a minor axis parallel to the first surface and a major axis perpendicular to the first surface.

The light guiding plate may also include a plurality of spacing portions which are formed among the first protrusions in parallel with the first protrusions.

The width of the spacing portions may be less than one fifth of the width of the first protrusions.

The ellipse may have a minor axis radius a and a major axis radius b, wherein the minor axis radius a and the major axis radius b satisfy the following relation: $1 < b/a < 4$.

The light guiding plate may also include one or more reflection patterns which are formed among the second protrusions and have at least one reflection surface that faces the light receiving surface.

The second protrusions may extend in the same direction as the first protrusions in parallel with the first protrusions. Other aspects of the disclosure will be become clearer from the below detailed description.

BRIEF DESCRIPTION OF THE DRAWINGS

The above and other aspects and features of the present disclosure of invention will become more apparent by describing in detail exemplary embodiments thereof with reference to the attached drawings, in which.

DETAILED DESCRIPTION

The present disclosure of invention will now be provided more fully with reference to the accompanying drawings, in which exemplary embodiments are shown.

Figure 1:
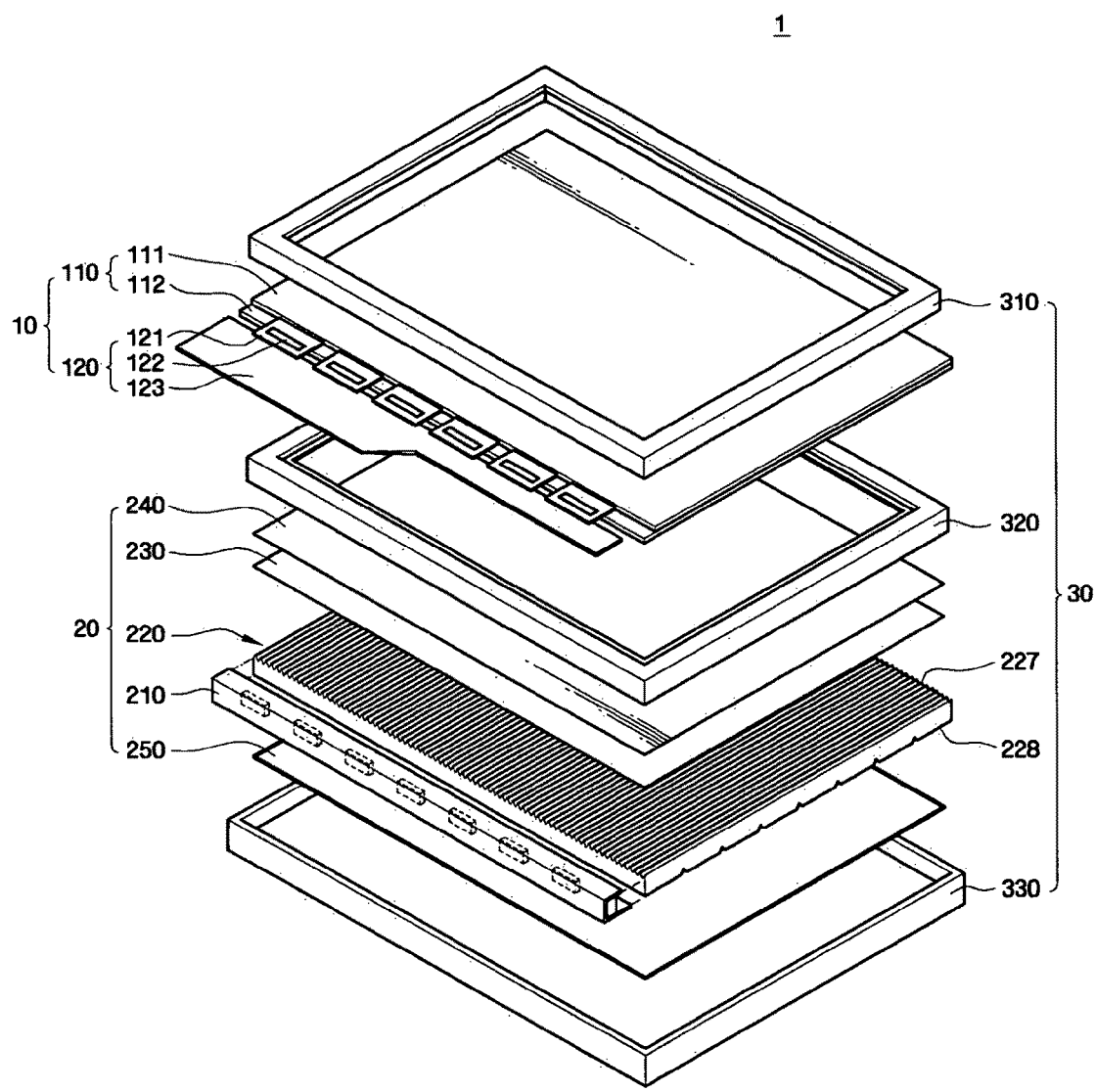
FIG. 1 illustrates an exploded perspective view of a liquid crystal display (LCD) device according to an exemplary embodiment.

FIG. 1 illustrates an exploded perspective view of a liquid crystal display (LCD) device 1 according to an exemplary embodiment. Referring to FIG. 1, an LCD device 1 includes a display panel assembly 10 which displays an image with the aid of light, a backlight assembly 20 which provides light to the display panel assembly 10, and a housing unit 30 which accommodates and fixes the display panel assembly 10 and the backlight assembly 20.

The display panel assembly 10 includes a display panel 110 which displays an image and a driving unit 120 which drives the display panel 110. The display panel 110 includes a thin film transistor (TFT) substrate 112, a color filter substrate 112 and a liquid crystal layer (not shown) which is interposed between the TFT substrate 112 and the color filter substrate 112. The driving unit 120 is disposed on one side of the TFT substrate 112. The driving unit 120 includes a plurality of flexible printed circuit boards (FPCBs) 121, a plurality of driving chips 122 which are mounted on the respective FPCBs 121, and a printed circuit board (PCB) 123 which is connected to the FPCBs 121. The driving unit 120 may be formed using a chip-on-film method. Alternatively, the driving unit 120 may be formed using a tape carrier package (TCP) method or a chip-on-glass (COG) method. All or some of the driving chips 122 may be formed during the formation of a TFT (not shown) of the TFT Substrate 112.

The backlight assembly 20, which supplies light to the display panel 110, is disposed at a rear side of the display panel 110. The backlight assembly 20 includes a light source 210, a light guiding plate 220 which is disposed between the light source 210 and the display panel 110 and transmits light generated by the light source 210 to the display panel 110, a prism sheet 230 which is disposed between the light guiding plate 220 and the display panel 110 and refracts and transmits light emitted from the light guiding plate 220 toward the display panel 110, a diffusion sheet 240 which diffuses light, and a reflection sheet 250 which is disposed at a rear side of the light guiding plate 220 and reflects leakage light upward. The light source 210 may include edge-mounted point light sources such as light-emitting diodes (LED's). Alternatively, an elongated linear lamp (not shown) such as a fluorescent lamp may be used as the edge-mounted light source 210. The light guiding plate 220 has a light emission surface 227 which is configured to enable light incident upon an edge of the light guiding plate 220 to be uniformly transmitted across the entire surface of the display panel 110. The light guiding plate 220 also has an opposite surface 228 which is on the opposite side of the light emission surface 227. A plurality of patterns having a predetermined shape may be formed on the light emission surface 227 and/or on the opposite surface 228 of the light guiding plate 220, which will be described later in detail. The backlight assembly 20 may be disposed at a front side of the display panel 110, and the positions and structures of the prism sheet 230, the diffusion sheet 240 and the reflection sheet 250 may be altered if desired.

The housing unit 30 includes a bottom chassis 330 which accommodates the backlight assembly 20, a molded frame 320 which is disposed between the backlight assembly 20 and the display panel 110, fixes the backlight assembly 20, and guides the position of the display panel 110, and a top chassis 310 which covers the front of the display panel 110 to support the backlight assembly 20 and the display panel 110.

A light guiding plate according to an exemplary embodiment of the present disclosure of invention will hereinafter be described in detail with reference to FIGS. 2A through 2D.

Figure 2A:
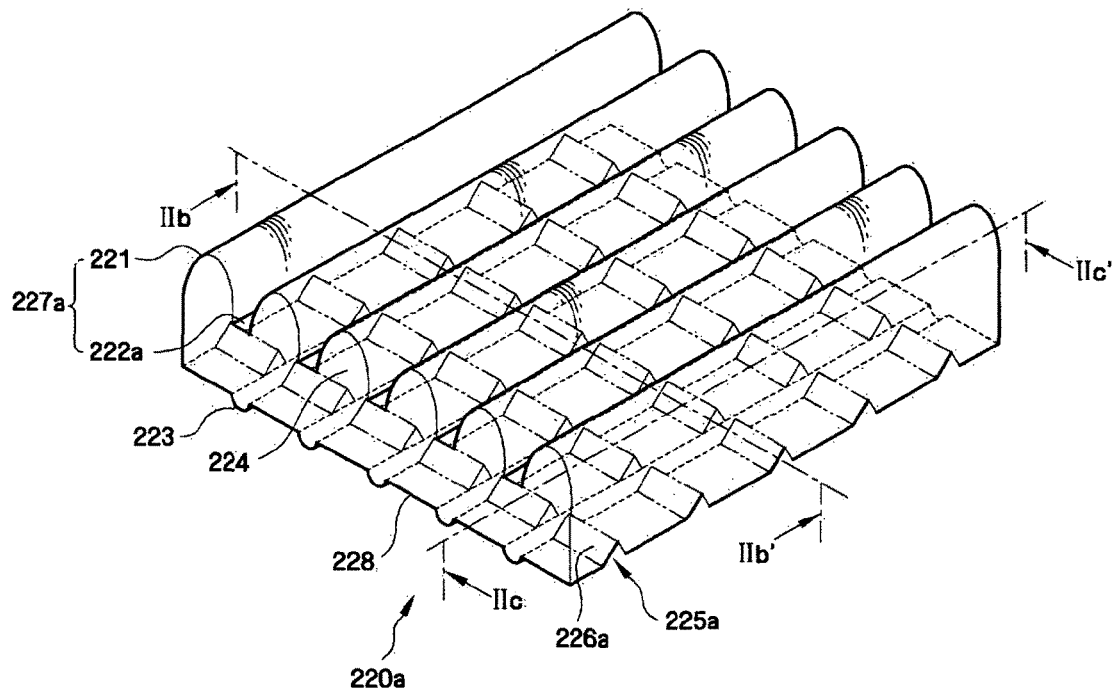
FIG. 2A illustrates a perspective view of a light guiding plate according to a first exemplary embodiment.
Figure 2B:
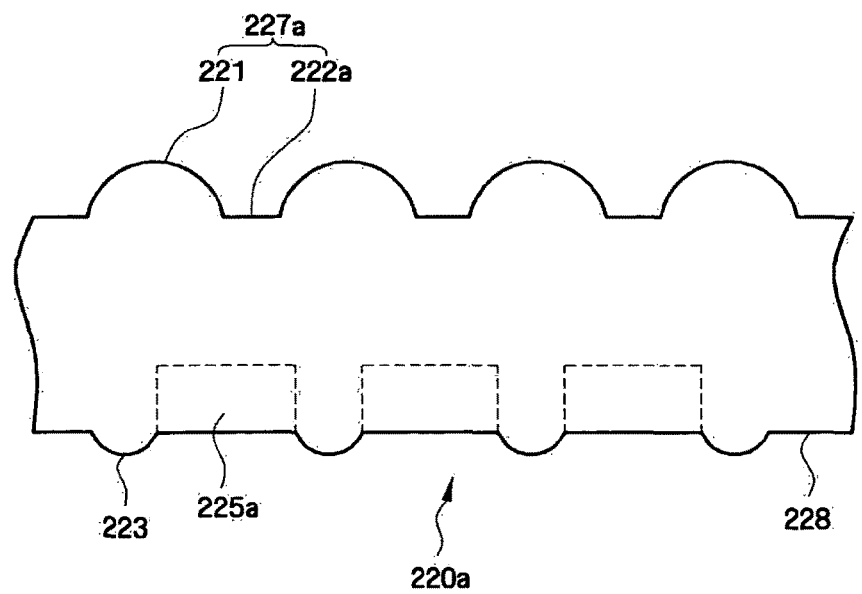
FIG. 2B illustrates a cross-sectional view taken along line IIb-IIb' of FIG. 2A.
Figure 2C:
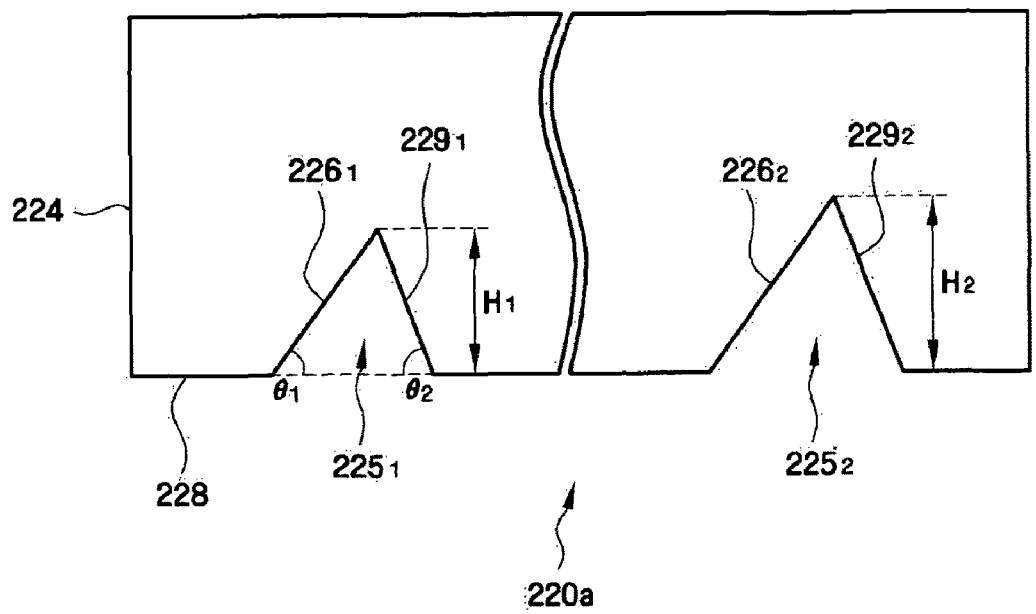
FIG. 2C illustrates a cross-sectional view taken along line IIc-IIc' of FIG. 2A.
Figure 2D:
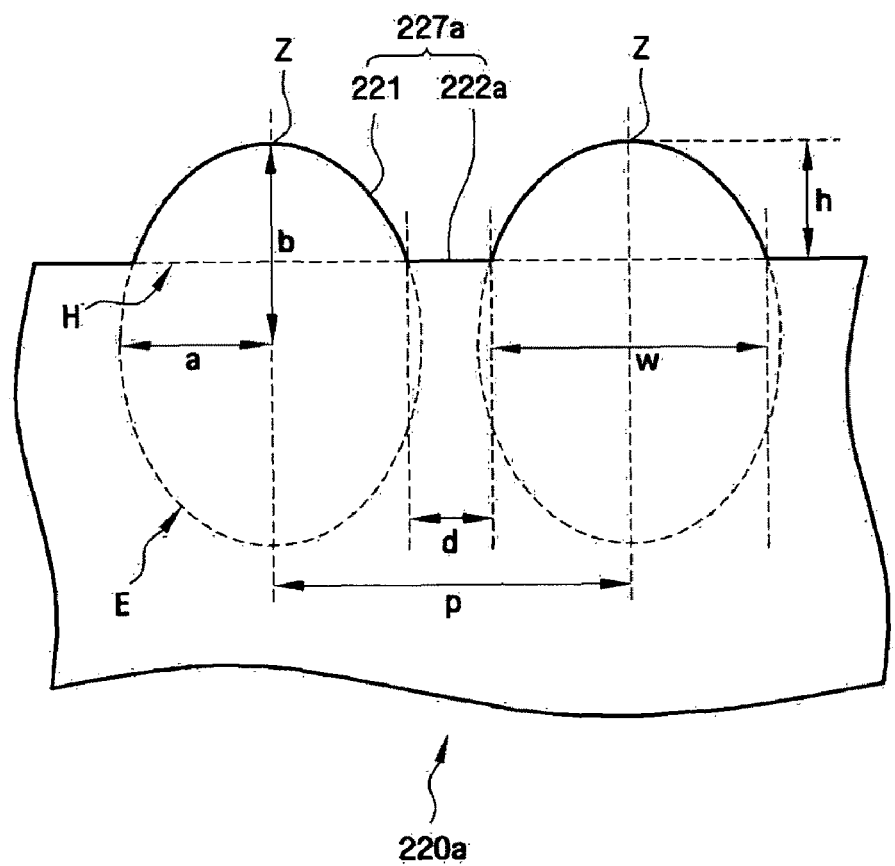
FIG. 2D illustrates a detailed cross-sectional view taken along line IIb-IIb' of FIG. 2A.

FIG. 2A illustrates a perspective view of a light guiding plate 220a made of a transparent material (e.g., plastic) having a predetermined refractive index greater than that of air and shaped according to a first exemplary embodiment, FIG. 2B illustrates a first cross-sectional view taken along line IIb-IIb' of FIG. 2A, FIG. 2C illustrates a cross-sectional view taken along line IIc-IIc' of FIG. 2A, and FIG. 2D illustrates another detailed cross-sectional view taken along line IIb-IIb' of FIG. 2A.

Referring to FIGS. 2A through 2C, the light guiding plate 220a includes an upper major surface having a plurality of light emission surface portions 227a where each light outputting surface portion 227a includes a convex first protrusion 221 contiguous with and extending above an adjacent flat portion 222a. The light guiding plate 220a further includes on at least one edge thereof, a light receiving surface 224 which faces an edge-mountable light source (not shown). In one embodiment, the first protrusions 221 extend longitudinally in a direction perpendicular to the plane of the light receiving surface 224 so as to define partial cylinders or elongations of a partial ellipse. In other words, the first protrusions 221 may each have a cross-section of the shape of a partial ellipse or a partial circle when viewed in cross section (e.g., FIG. 2B, 2D) along a plane parallel to the light receiving surface 224. As indicated above, plurality of flat spacing portions 222a are interposed between the first protrusions 221.

Still referring to FIGS. 2A through 2C, the light guiding plate 220a includes a lower major surface 228 having a plurality of convex second protrusions 223 formed thereon. The second protrusions 223 may be elongated in the same elongation direction as the first protrusions 221, and as seen in FIG. 2B there may be a one-for-one correspondence between the first and second convex protrusions, 221 and 223. The lower major surface 228 may further include a plurality of light refracting cutouts referred to herein as reflection patterns 225a where the latter are interposed between the second protrusions 223 as may be best seen in FIG. 2A. Referring to FIG. 2C, each of the reflection patterns 225a has a first reflection surface 226a which is closer to and faces the light receiving surface 224 at a first angle ($\theta 1$). In one embodiment, the reflection patterns 225 are engraved into the bottom surface 228 as hollow regions in the shape of rectangular prisms. Alternatively, the reflection patterns 225 may be formed on the bottom surface 228 as printed patterns of reflective metal angled at appropriate angles for providing desired light reflection functions.

Referring to the embodiment of FIG. 2C, the light guiding plate 220a is shaped to includes a plurality of reflection zones $225_1$ and $225_2$ which are V-shaped and are formed on the lower surface 228 of the light guiding plate 220a as recessed patterns. Each of the reflection zones $225_1$ and $225_2$ has a first reflection surface $226_1$ closer to surface 224 and a second reflection surface $226_2$ farther from surface 224, respectively. In order to improve the efficiency of the reflection of light, a base angle $\theta_1$ of the first reflection surface $226_1$ and a base angle $\theta_2$ of the second reflection surface $226_2$ may be set to satisfy the following relation: $\theta_1 \leq \theta_2$. The more distant the reflection zones $225_1$, $225_2$, etc. are from the primary light inputting or receiving surface 224, the lower the luminance of a reflected light pattern tends to be for the respective reflection zone. Thus, in accordance with the disclosure and in order to improve the luminance of a reflected light pattern at a position more distant from the light receiving surface 224, the corresponding height (e.g., $H_2$) of the more distant reflection zone (e.g., $225_2$) is set to be greater than a height (e.g., $H_1$) of the closer reflection pattern (e.g., $225_1$). In one embodiment, the light guiding plate 220a is formed of a plastic comprising at least one of a polycarbonate (PC)-series resin, a polymethylmethacrylate (PMMA)-series resin or a methacrylate-styrene (MS) copolymer.

Referring to FIG. 2D, in one class of embodiments, the cross-sections of the first protrusions 221 have the shape of part of an imaginary ellipse E. The minor axis (minor axis radius: a) of the imaginary ellipse E is parallel with an imaginary horizontal surface H that extends between the interfaces between the first protrusions 221 and the spacing portions 222A, and the major axis (major axis radius: b) of the imaginary ellipse E is perpendicular to the imaginary horizontal surface H. Ideally, the cross-sections of the first protrusions 221 have the shape of part of the imaginary ellipse E. However, preferably, the first protrusions 221 may partially have an angular cross-section, rather than a round filet cross-section, near the interfaces with the spacing portions 222a due to a process margin. In order to improve luminance uniformity, the minor axis radius a and the major axis radius b of the imaginary ellipse E may satisfy the following relation: $1 < b/a < 4$. In its implementation, the surface of the imaginary ellipse E may be approximated by a fourth-degree polynomial if the imaginary ellipse E satisfies the following relation: $a < b/2$. On the other hand, the imaginary ellipse E may be approximated by an ellipse function or a fourth-degree or higher polynomial if the imaginary ellipse E satisfies the following relation: $a > b/2$. A height h of an apex Z of the imaginary ellipse E from the imaginary horizontal surface H may be less than the major axis radius b of the ellipse E. A distance between a pair of adjacent first protrusions 221, i.e., a width d of the spacing portions 222a, may be the same as or less than one fifth of a width w of the first protrusions 221.

More specifically, the width d may be the same as or less than one tenth of the width w. That is, a distance between the apexes Z of the pair of adjacent first protrusions 221, i.e., a pitch p of the first protrusions 221, may satisfy the following relation: p=w+d where d<2.

A light guiding plate according to an exemplary second embodiment of the present invention will hereinafter be described in detail with reference to FIGS. 3A and 3B.

Figure 3A:
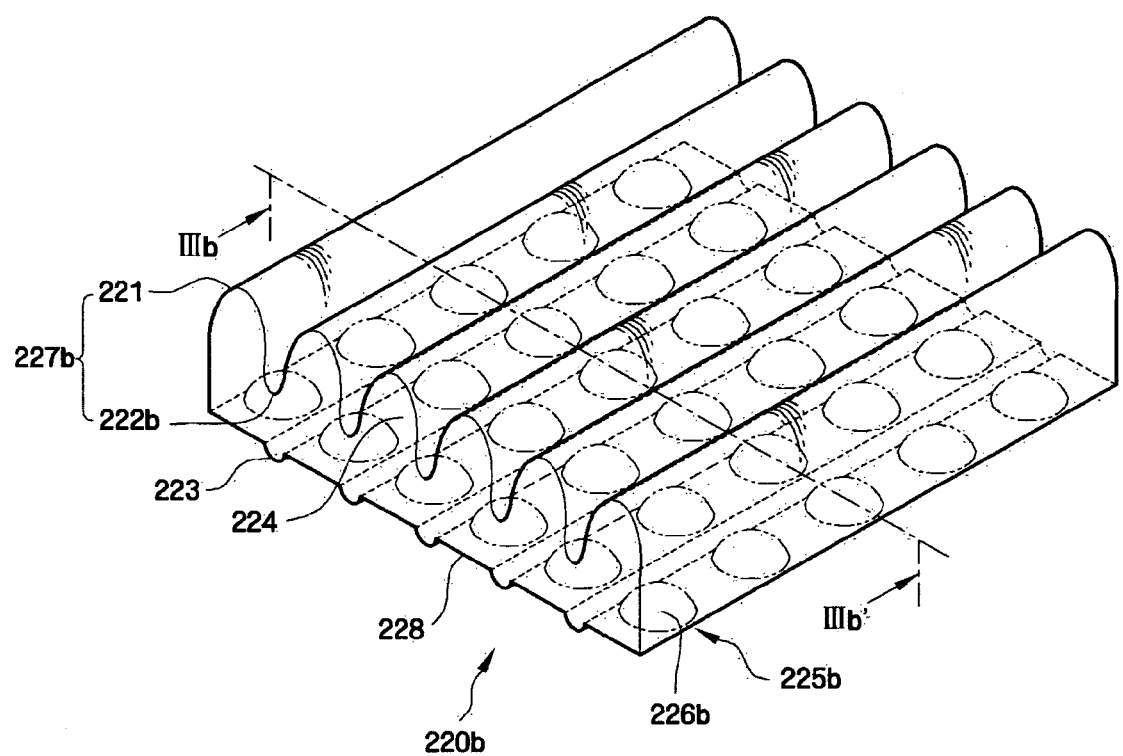
FIG. 3A illustrates a perspective view of a light guiding plate according to a second exemplary embodiment.
Figure 3B:
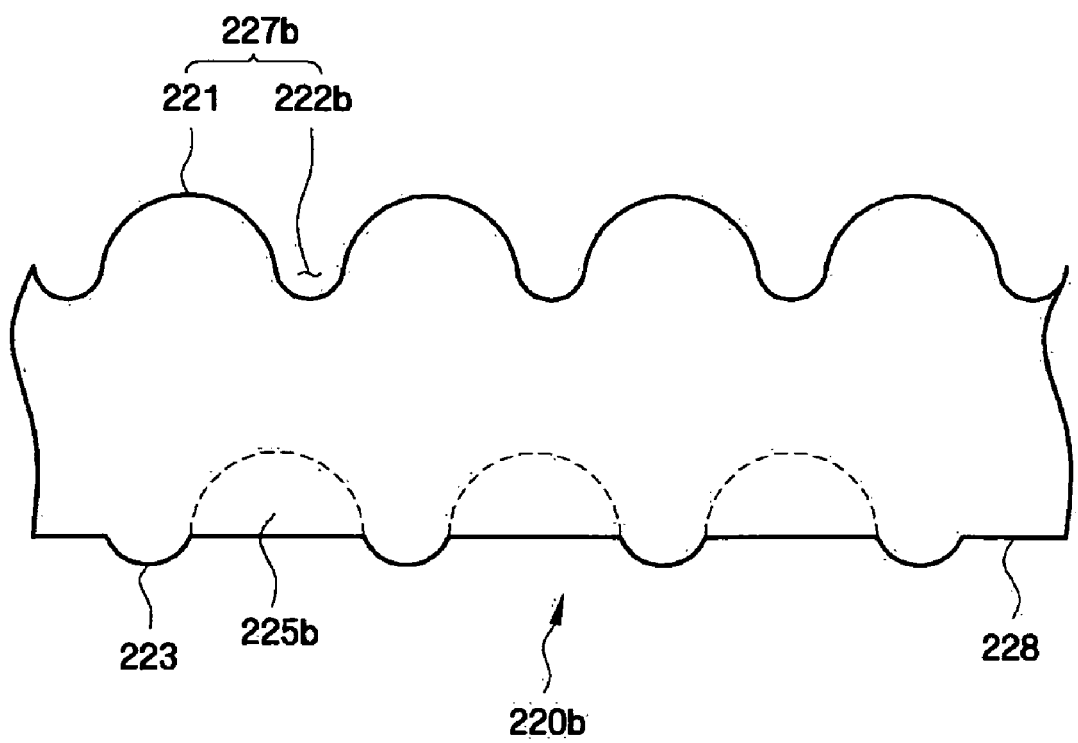
FIG. 3B illustrates a cross-sectional view taken along line IIIb-IIIb' of FIG. 3A.

FIG. 3A illustrates a perspective view of a light guiding plate 220B according to the second exemplary embodiment, and FIG. 3B illustrates a cross-sectional view taken along line IIIb-IIIb' of FIG. 3A. In FIGS. 2A through 2D, 3A and 3B, like reference numerals represent like elements, and thus, detailed descriptions thereof will be skipped.

Referring to FIGS. 3A and 3B, the light guiding plate 220b includes a plurality of rounded spacing portions 222b which are formed among a plurality of first protrusions 221 as recesses, and a plurality of reflection patterns 225b which are formed as hemispherical recessed patterns.

The rounded spacing portions 222b are recessed into the light emission surface 227b as shown. The spacing portions 222b are elongated in the same direction as the first protrusions 221 and are parallel to the first protrusions 221. The spacing portions 222b may have a cross-section of the shape of a partial circle or a partial ellipse along a plane parallel to a light receiving surface 224 and is perpendicular to the direction in which the first protrusions 221 extend.

One or more second protrusions 223 are formed on an opposite (bottom) surface 228 which is on the opposite side of the plate from the light emission surface 227b. A plurality of reflection patterns 225b are formed among the second protrusions 223. Each of the reflection patterns 225b includes a forward reflection surface 226b which faces and is closer to the light receiving surface 224. The reflection patterns 225b are recessed into the opposite surface 228 as shown. The diameter of a reflection pattern 225b that is more distant from the light receiving surface 224 may be greater than the corresponding diameter of a reflection pattern 225b that is less distant from the light receiving surface 224 so as to compensate for diminution of incident luminance with increase of distance from the light sourcing surface 224. However, the shape of the reflection patterns 225b is not restricted to that of the hemispherical concavities illustrated in FIGS. 3A and 3B. That is, the reflection patterns 225b may be formed as otherwise shaped concavities or as reflective protrusions formed of reflective metal for example.

A light guiding plate according to exemplary third embodiment will hereinafter be described in detail with reference to FIGS. 4A through 4C.

Figure 4A:
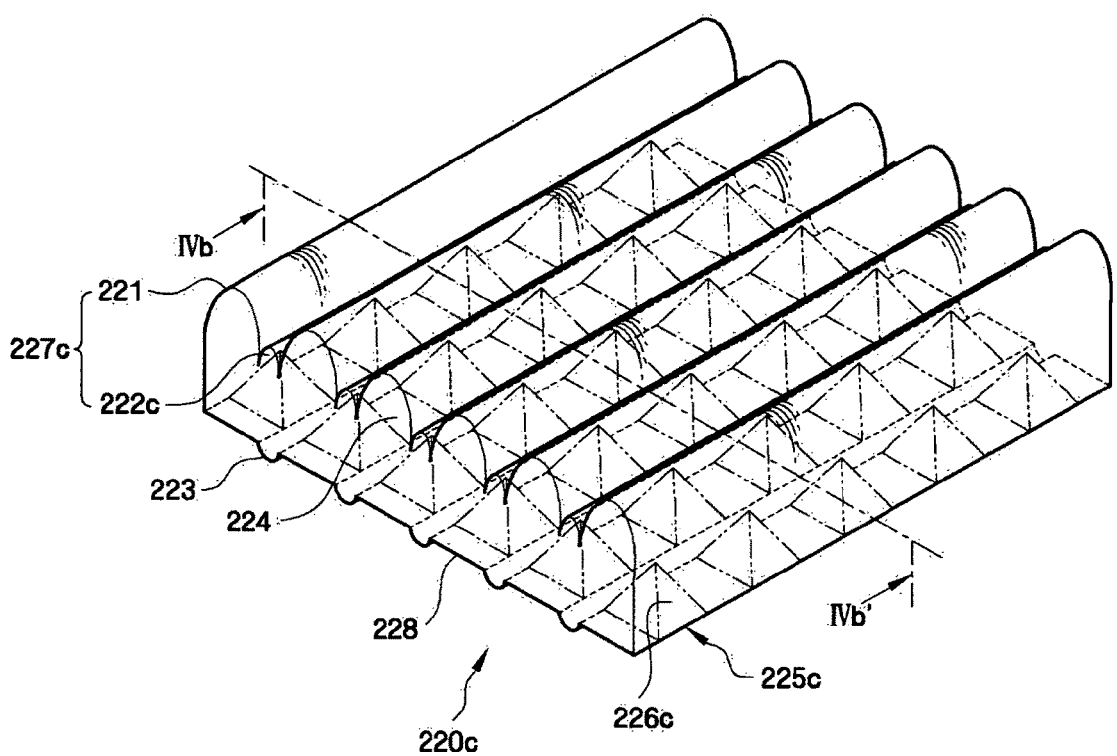
FIG. 4A illustrates a perspective view of a light guiding plate according to another exemplary embodiment.
Figure 4B:
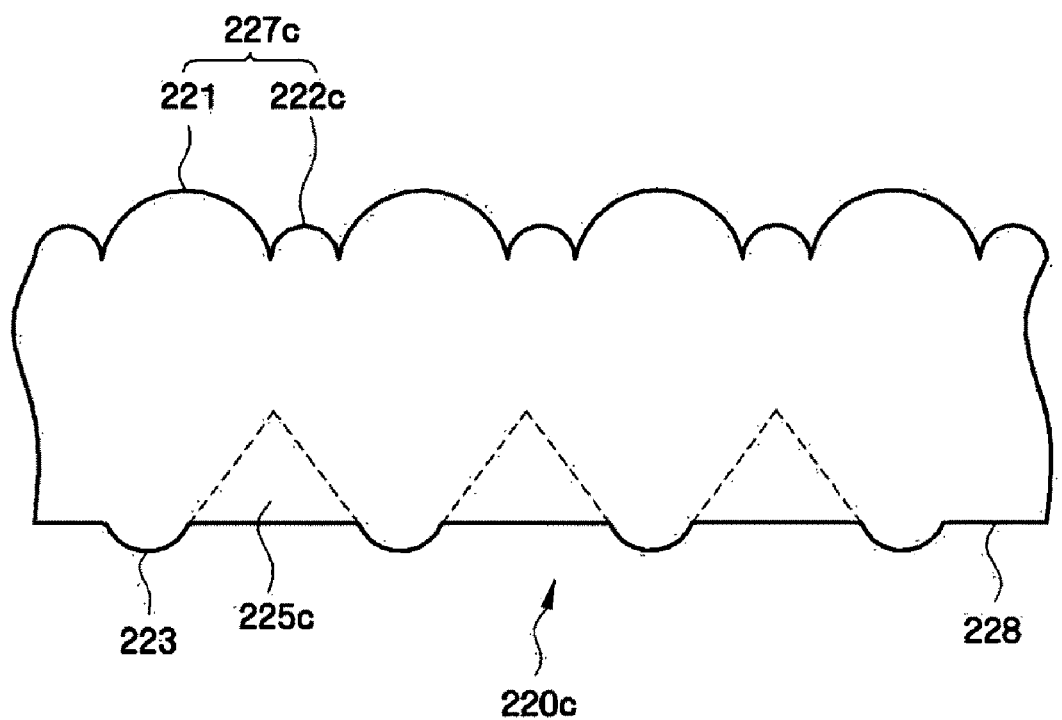
FIG. 4B illustrates a cross-sectional view taken along line IVb-IVb' of FIG. 4A.
Figure 4C:
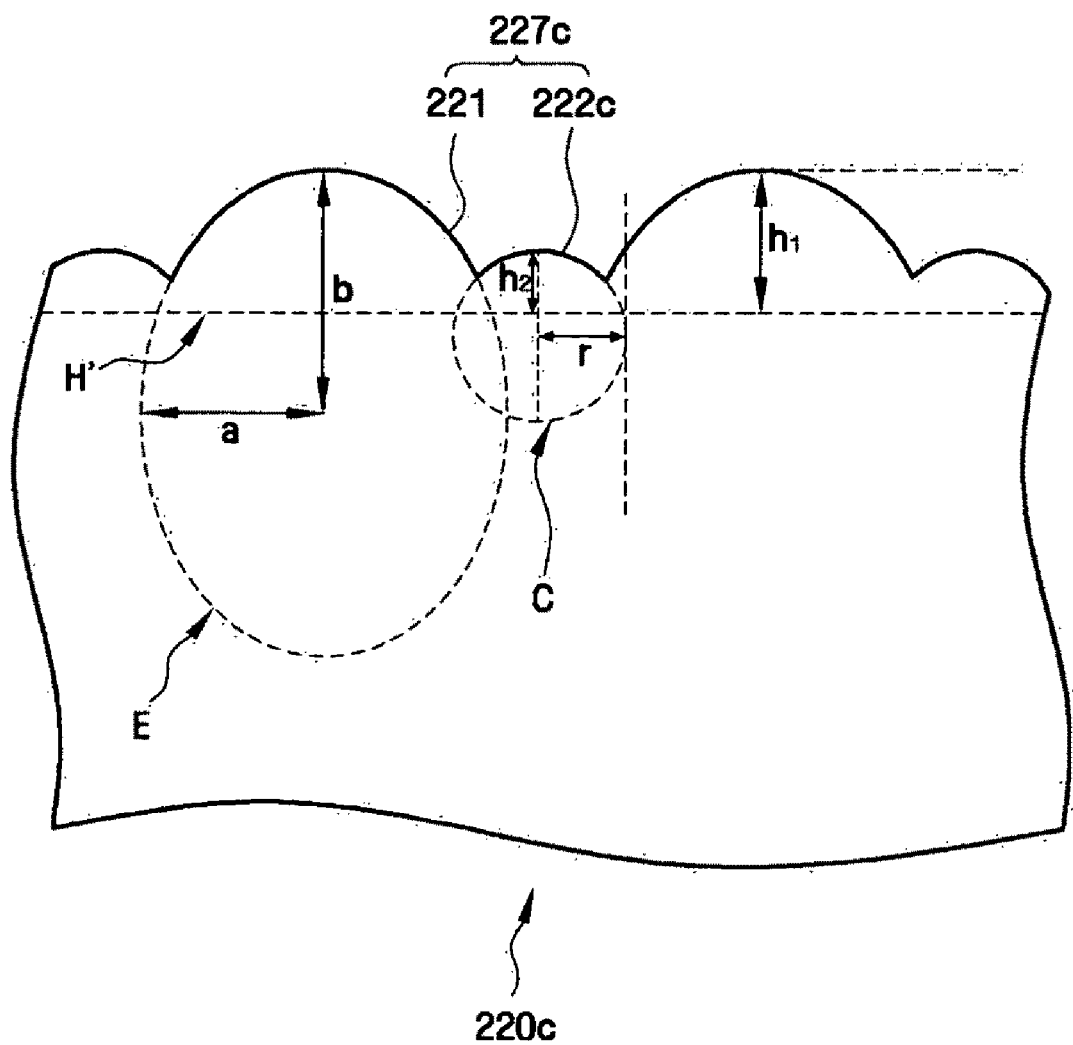
FIG. 4C illustrates a detailed cross-sectional view taken along line IVb-IVb' of FIG. 4A.

FIG. 4A illustrates a perspective view of a light guiding plate 220c according to the third exemplary embodiment, FIG. 4B illustrates a cross-sectional view taken along line IVb-IVb' of FIG. 4A, and FIG. 4C illustrates a detailed cross-sectional view taken along line IVb-IVb' of FIG. 4A. In FIGS. 2A through 2D and 4A through 4C, like reference numerals represent like elements, and thus, detailed descriptions thereof will be skipped.

Referring to FIGS. 4A through 4C, the light guiding plate 220c includes a plurality of first protrusions 221, a plurality of convex spacing portions 222c which are formed to be interposed among the first protrusions 221 and to protrude from a light emission surface 227c, and a plurality of reflection patterns 225c which are formed on an opposite surface 228 as pyramid-shaped hollows for example. The opposite surface 228 is on the opposite side of the light emission surface 227c.

The spacing portions 222c are formed on the light emission surface 227c as protrusions. The spacing portions 222c may extend in the same direction as the first protrusions 221 and may thus be parallel to the first protrusions 221. The spacing portions 222c may have a cross-section of the shape of a partial circle or a partial ellipse along a plane parallel to a light receiving surface 224 and is perpendicular to the direction in which the first protrusions 221 extend.

One or more second protrusions 223 are formed on the opposite surface 228, and the reflection patterns 225c are formed among the second protrusions 223 as pyramids. Each of the reflection patterns 225c has a reflection surface 226c which is triangular. The area of the reflection surface 226c of a reflection pattern 225c that is more distant from the light receiving surface 224 may be greater than the corresponding area of the reflection surface 226c of a reflection pattern 225c that is less distant from the light receiving surface 224.

Referring to FIG. 4C, the cross-sections of the first protrusions 221 have the shape of part of an imaginary ellipse E. The minor axis (minor axis radius: a) of the imaginary ellipse E is parallel with an imaginary horizontal surface H' that extends between the interfaces between the first protrusions 221 and the spacing portions 222c, and the major axis (major axis radius: b) of the imaginary ellipse E is perpendicular to the imaginary horizontal surface H'.

The cross-sections of the spacing portions 222c have the shape of part of an imaginary circle C having a radius r. A height h1 of the first protrusions 221 from the imaginary horizontal surface H' may be greater than a height h2 of the spacing portions 222c from the imaginary horizontal surface H'. The height h2 may be less than the radius r of the imaginary circle C.

The radius r of the imaginary circle C may be less than the minor axis radius a of the imaginary ellipse E.

A light guiding plate according to another exemplary embodiment will hereinafter be described in detail with reference to FIGS. 5A and 5B.

Figure 5A:
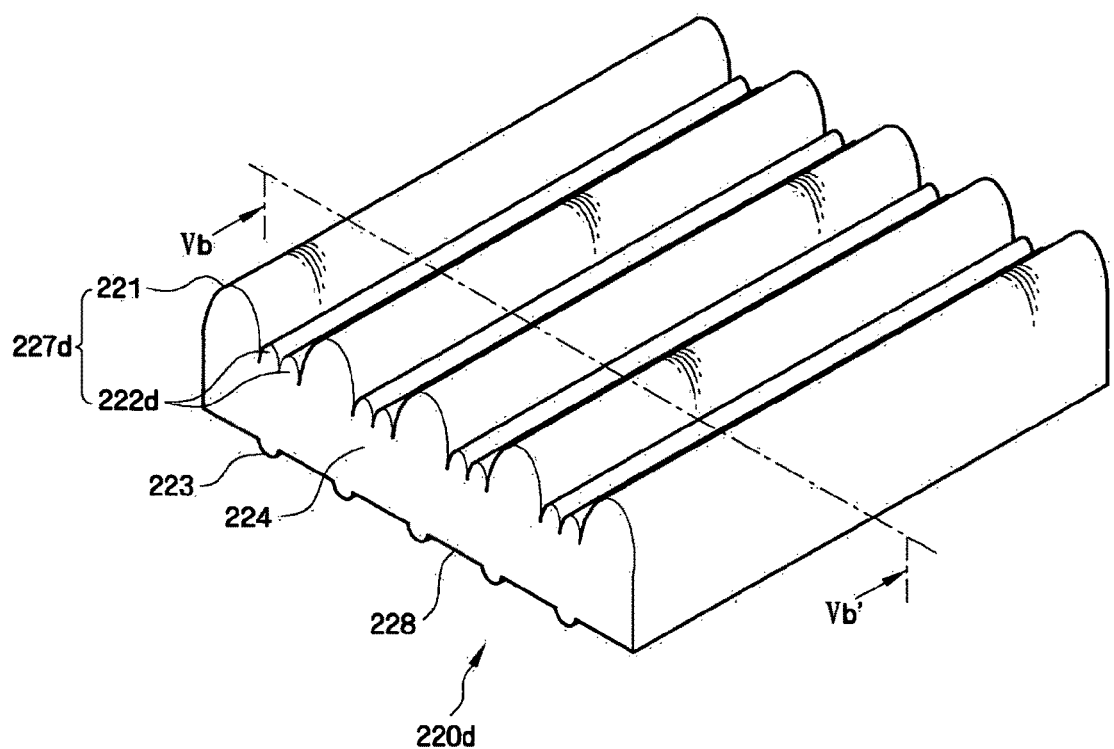
FIG. 5A illustrates a perspective view of a light guiding plate according to another exemplary embodiment.
Figure 5B:
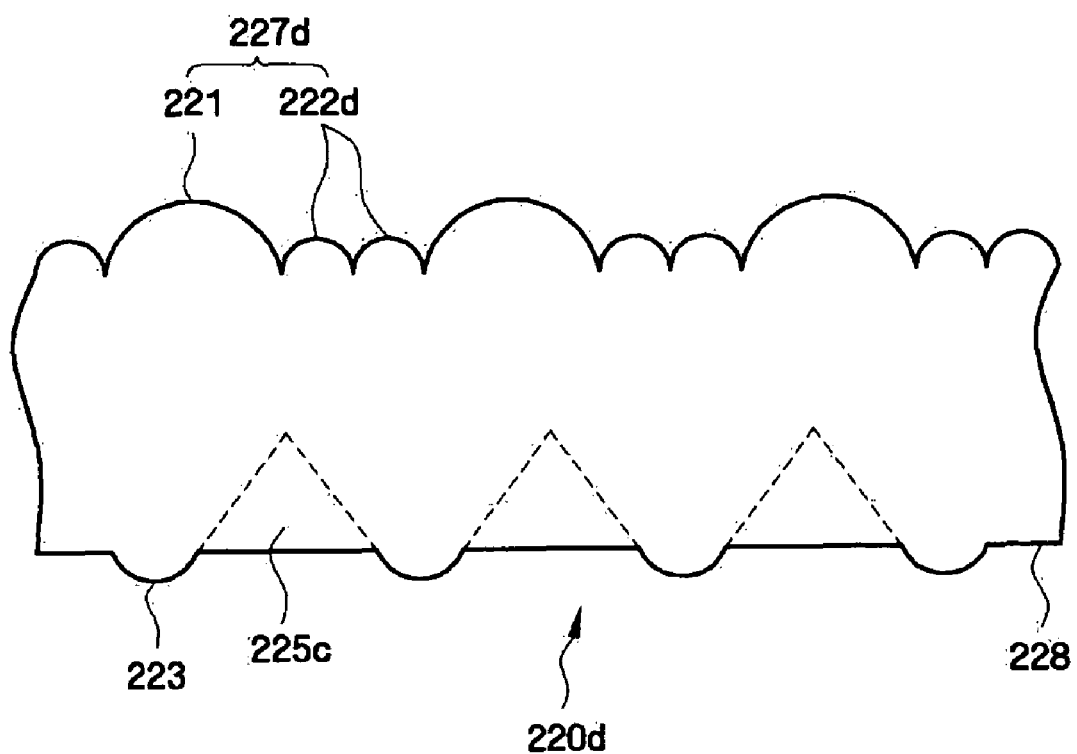
FIG. 5B illustrates a cross-sectional view taken along line Va-Va' of FIG. 5A.

FIG. 5A illustrates a perspective view of a light guiding plate 220d according to another exemplary embodiment, and FIG. 5B illustrates a cross-sectional view taken along line Vb-Vb' of FIG. 5A. In FIGS. 4A through 4C, 5A and 5B, like reference numerals represent like elements, and thus, detailed descriptions thereof will be skipped.

Referring to FIGS. 5A and 5B, the light guiding plate 220d includes a plurality of first protrusions 221 and a plurality of spacing portions 222d. More specifically, one or more spacing portions 222d may be formed between a pair of successive first protrusions 221 as raised patterns. The spacing portions 222d may extend in the same direction as the first protrusions 221. The spacing portions 222d may have an almost hemicircle or hemi-elliptical cross-section when taken along a plane parallel to a light receiving surface 224 and is perpendicular to the direction in which the first protrusions 221 extend.

More specifically, one or more spacing portions 222d may be formed between a pair of adjacent first protrusions 221 as protrusions, and the cross-sections of the spacing portions 222d may have the shape of a partial circle or a partial ellipse. The shape of the spacing portions 222d and the number of spacing portions 222d formed between the pair of adjacent first protrusions 221 may be altered if necessary. For example, the shapes of the first protrusions 221 and the spacing portions 222d may be altered according to the position and the type of a light source.

The width of the spacing portions 222d may be varied to provide different optical effects as may be deemed appropriate. For example, one or more spacing portions 222d may be formed between a pair of adjacent first protrusions 221 as raised patterns, and the number of spacing portions 222d formed between the pair of adjacent first protrusions 221 may vary from one portion to another portion of the light guiding plate 220d according to the type and the position of a light source.

A light guiding plate according to another exemplary embodiment will hereinafter be described in detail with reference to FIGS. 6A and 6B.

Figure 6A:
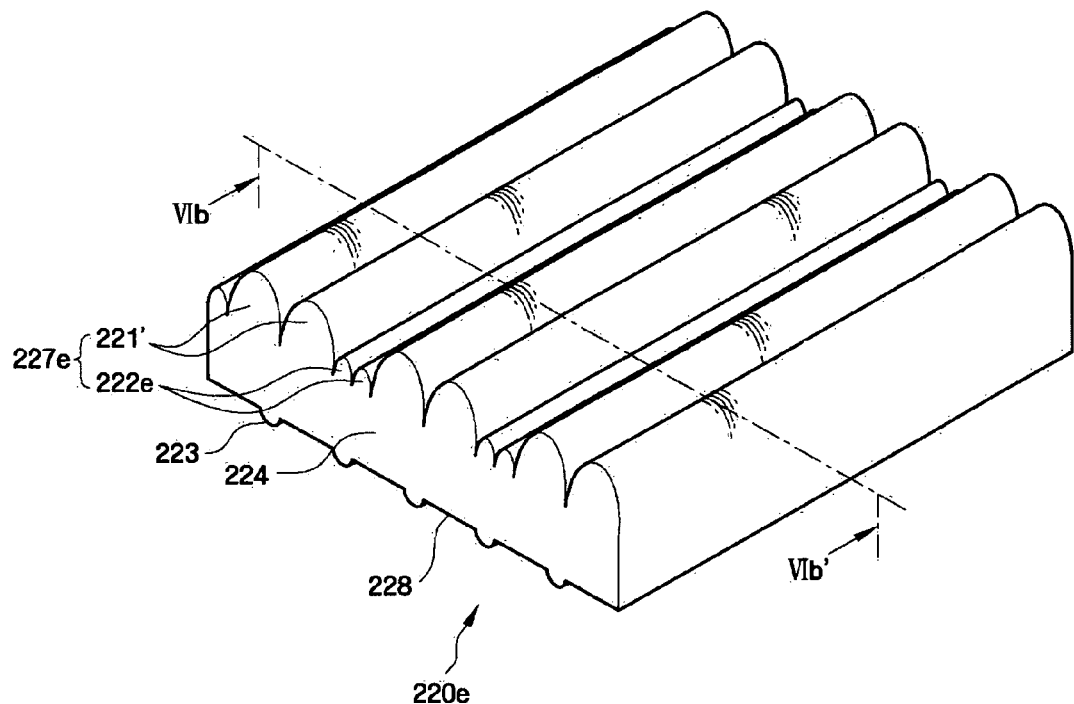
FIG. 6A illustrates a perspective view of a light guiding plate according to another exemplary embodiment.
Figure 6B:
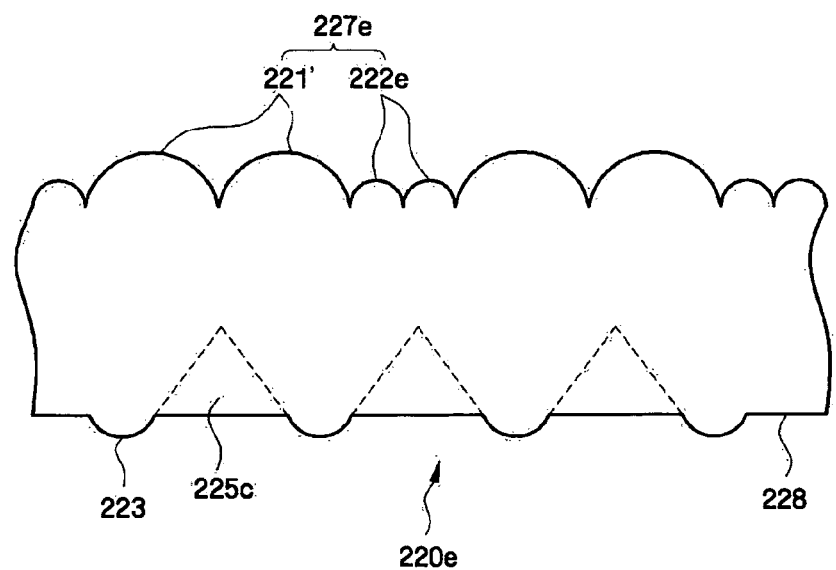
FIG. 6B illustrates a cross-sectional view taken along line VIa-VIa' of FIG. 6A.

FIG. 6A illustrates a perspective view of a light guiding plate 220e according to another exemplary embodiment, and FIG. 6B illustrates a cross-sectional view taken along line VIb-VIb' of FIG. 6A. In FIGS. 4A through 4C, 6A and 6B, like reference numerals represent like elements, and thus, detailed descriptions thereof will be skipped.

Referring to FIGS. 6A and 6B, the light guiding plate 220E includes a plurality of first protrusions 221' which are formed as raised patterns. The first protrusions 221' extend in a direction perpendicular to a light receiving surface 224. The cross-sections of the first protrusions 221' may have the shape of a partial circle or a partial ellipse. Two or three first protrusions 221' and two or three spacing portions 222e may be alternately arranged as shown.

A light guiding plate according to another exemplary embodiment will hereinafter be described in detail with reference to FIG. 7.

Figure 7:
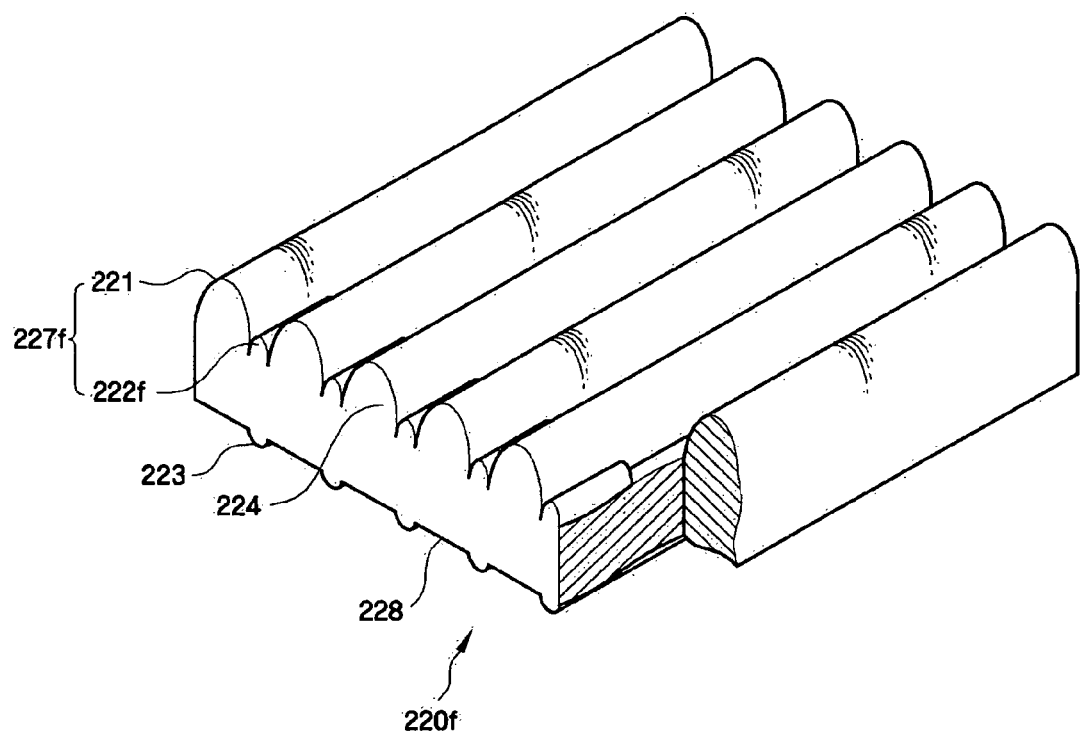
FIG. 7 illustrates a light guiding plate according to another exemplary embodiment.

FIG. 7 illustrates a perspective view of a light guiding plate 220f according to another exemplary embodiment. In FIGS. 4A through 4C and 7, like reference numerals represent like elements, and thus, detailed descriptions thereof will be skipped.

Referring to FIG. 7, the light guiding plate 220f includes a plurality of spacing portions 222f. Each of the spacing portions 222f includes a raised portion and a flat portion. The light guiding plate 220f also includes a light receiving surface 224 which faces a light source (not shown); a light emission surface 227f, and a plurality of first protrusions 221 which are formed on the light emission surface 227f. The light emission surface 227f is adjacent the light receiving surface 224. The first protrusions 221 may extend in a direction perpendicular to the light receiving surface 224. The spacing portions 222f may be disposed among the first protrusions 221. Portions of the spacing portions 222f close to the light receiving surface 224 may be formed as raised patterns, and portions of the spacing portions 222f distant from the light receiving surface 224 may be formed as non-raised flat patterns. However, the present disclosure of invention is not restricted to that illustrated in FIG. 7. That is, the portions of the spacing portions 222f close to the light receiving surface 224 may be formed as recessed patterns, and the portions of the spacing portions 222F distant from the light receiving surface 224 may be formed as raised patterns. The shape of the spacing portions 222f may be altered according to the type, position and shape of the corresponding light source so as to provide the desired uniform distribution of refracted light.

A light guiding plate according to another exemplary embodiment will hereinafter be described in detail with reference to FIGS. 8A and 8B.

Figure 8A:
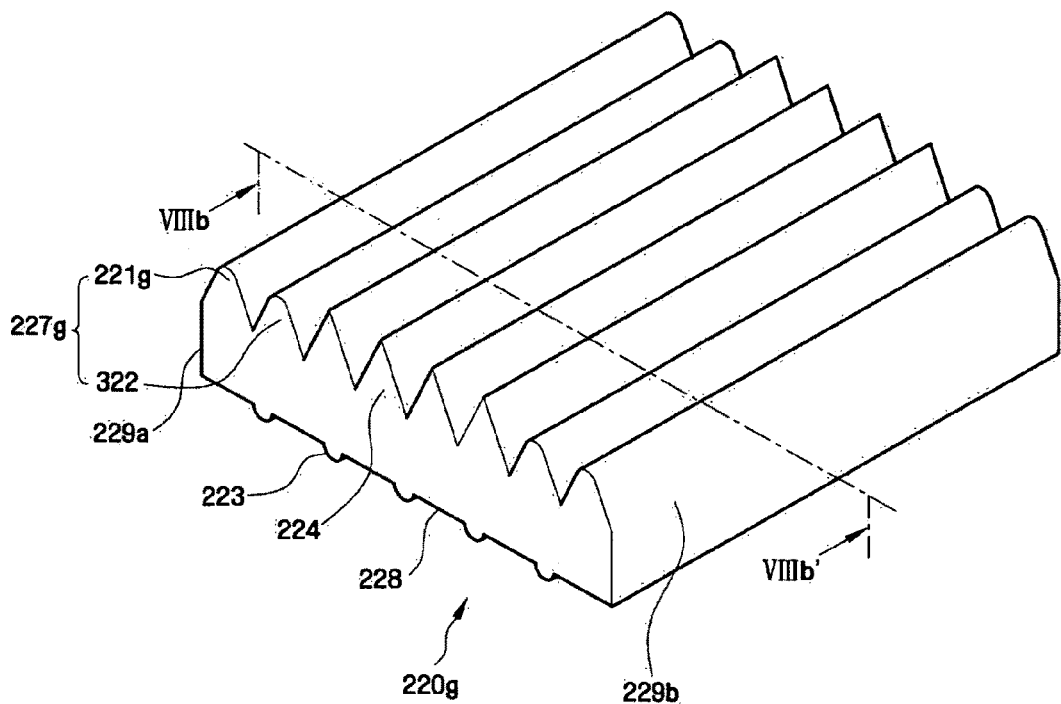
FIG. 8A illustrates a light guiding plate according to another exemplary embodiment.
Figure 8B:
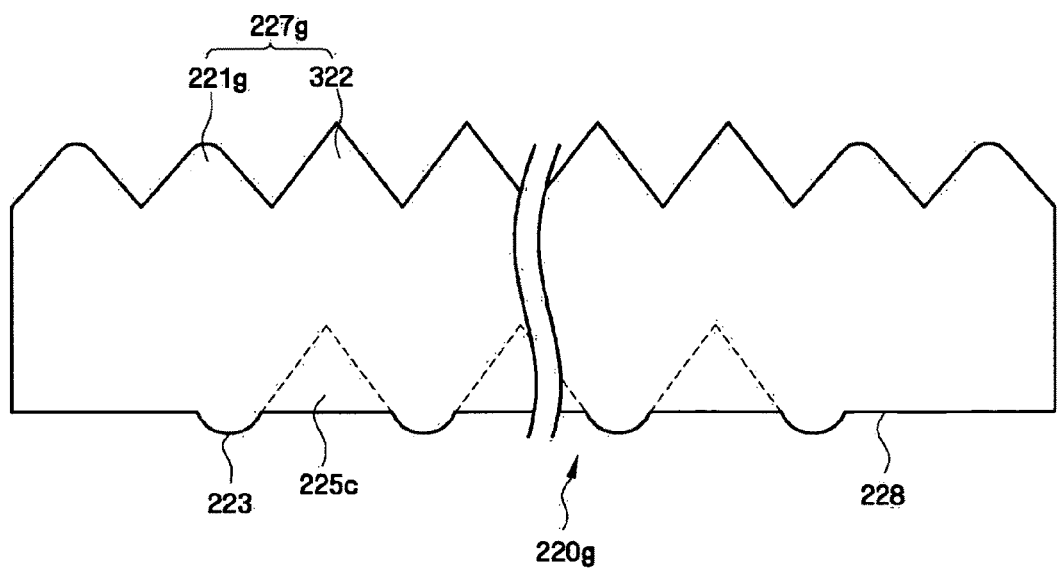
FIG. 8B illustrates a cross-sectional view taken along line VIIIa-VIIIa' of FIG. 8A.

FIG. 8A illustrates a perspective view of a light guiding plate 220g according to another exemplary embodiment, and FIG. 8B illustrates a cross-sectional view taken along line VIIIb-VIIIb' of FIG. 8A. In FIGS. 4A through 4C, 8A and 8B, like reference numerals represent like elements, and thus, detailed descriptions thereof will be skipped.

Referring to FIGS. 8A and 8B, the light guiding plate 220G includes a plurality of first protrusions 221g and a plurality of triangular patterns 322 which are all formed on a light emission surface 227g. More specifically, the light guiding plate 220g also includes a light receiving surface 224 which faces a light source (not shown) and the first protrusions 221g and the triangular patterns 322 which are formed on the light emission surface 227g. The light emission surface 227g is adjacent to the light receiving surface 224. The first protrusions 227g may extend in a direction perpendicular to the light receiving surface 224. The first protrusions 227g may be formed on portions of the light guiding plate 220g that are adjacent to either a lateral surface 229a or a lateral surface 229b of the light guiding plate 220g. The lateral surfaces 229a and 229b are perpendicular to the light receiving surface 224, the light emission surface 227g, and an opposite surface 228 that faces the light emission surface 227g. The cross-sections of the first protrusions 221g may be partially elliptical when taken along a plane parallel to the light receiving surface 224. More specifically, the cross-sections of upper portions of the first protrusions 221g may have the shape of a partial ellipse, and the cross-sections of lower portions of the first protrusions 221g may have an angular shape. That is, the cross-sections of the first protrusions 221g may have the shape of a triangle with a rounded top. The triangular patterns 322 may be formed between the first protrusions 221g. That is, the first protrusions 221g may be formed on both sides of the light guiding plate 220g, and the triangular patterns 322 may be formed between the first protrusions 221g.

The first protrusions 221g function to remove dark portions that may be generated in the output light due to frames on the lateral surfaces 229a and 229b being reflected by the light emission surface 227g. For this, the sum of the widths of first protrusions 221g on one side of the light guiding plate 220g may be two or more times greater than the width of the light guiding plate 220g.

A light guiding plate according to another exemplary embodiment will hereinafter be described in detail with reference to FIGS. 9A and 9B.

Figure 9A:
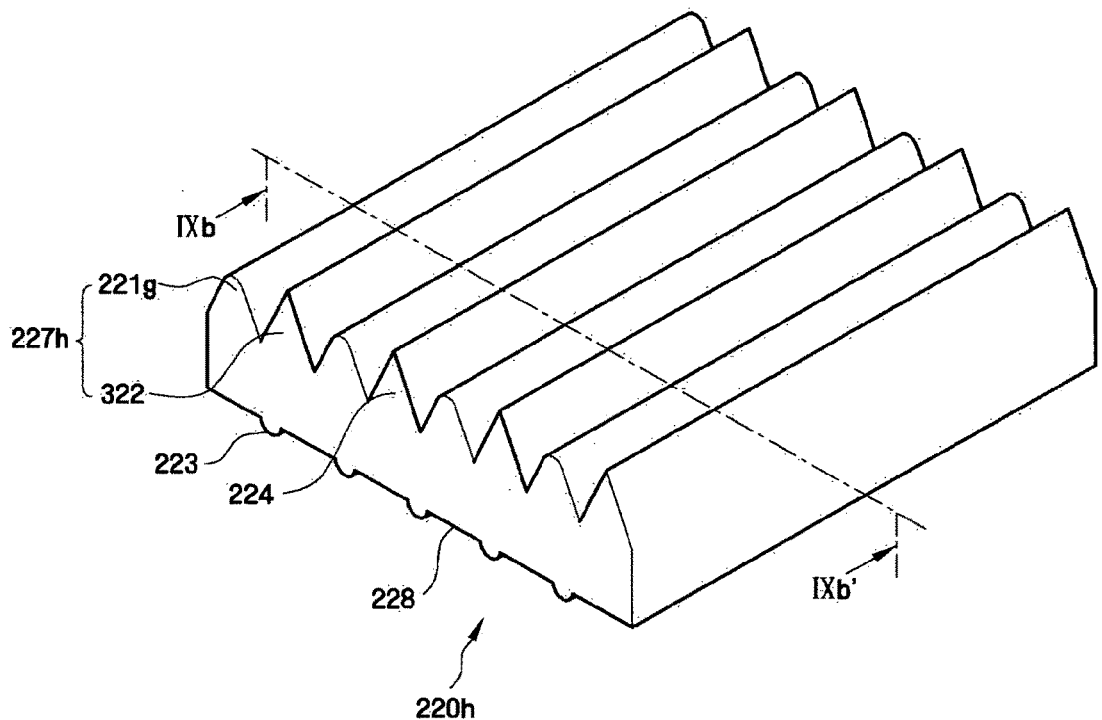
FIG. 9A illustrates a light guiding plate according to another exemplary embodiment.
Figure 9B:
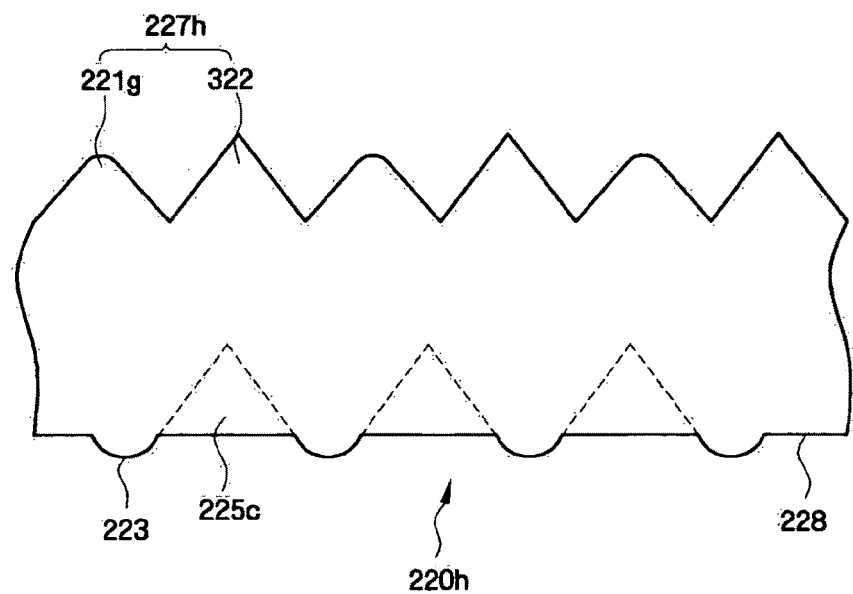
FIG. 9B illustrates a cross-sectional view taken along line IXa-IXa' of FIG. 9A.

FIG. 9A illustrates a perspective view of a light guiding plate 220h according to another exemplary embodiment, and FIG. 9B illustrates a cross-sectional view taken along line IXb-IXb' of FIG. 9A. In FIGS. 4A through 4C, 9A and 9B, like reference numerals represent like elements, and thus, detailed descriptions thereof will be skipped.

Referring to FIGS. 9A and 9B, the light guiding plate 220H includes a plurality of first protrusions 221g and a plurality of triangular patterns 322 which are alternately formed on a light emission surface 227h. The first protrusions 221g may be partially elliptical when taken along a plane parallel to a light receiving surface 224. More specifically, the cross-sections of upper portions of the first protrusions 221g may have the shape of a partial ellipse, and the cross-sections of lower portions of the first protrusions 221g may have an angular shape. That is, the cross-sections of the first protrusions 221g may have the shape of a triangle with a rounded top. The triangular patterns 322 may be formed among the first protrusions 221g. The first protrusions 221g and the triangular patterns 322 may extend in parallel with one another and may be alternately arranged on the light emission surface 227h.

Figure 10A:
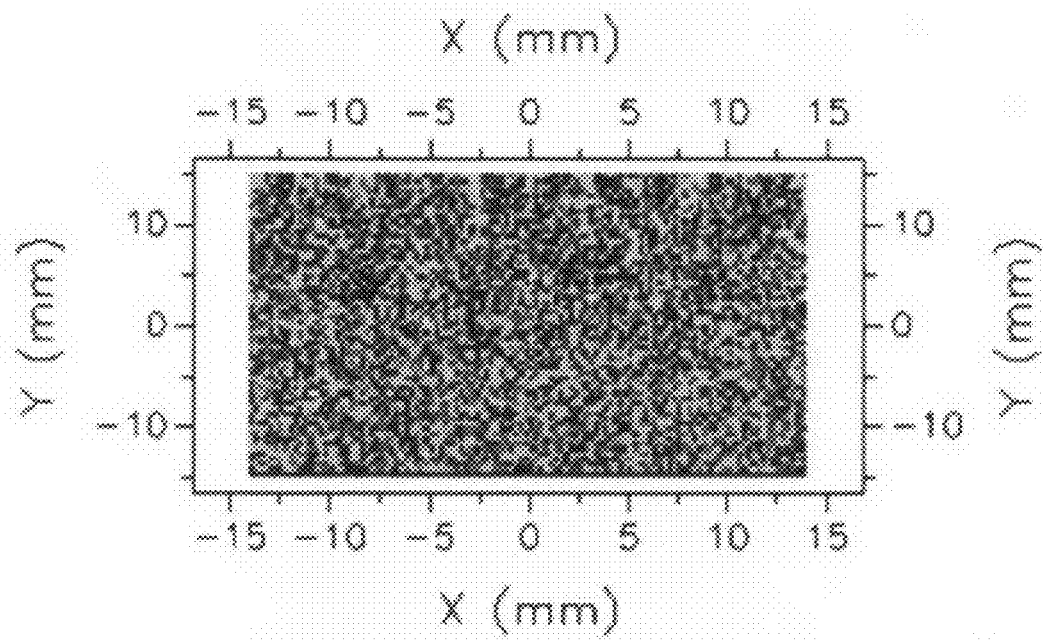
FIGS. 10A through 10C illustrate color-coded diagrams of computer simulation results of the luminance properties of the light guiding plate of the embodiment of FIGS. 2A through 2D.
Figure 10B:
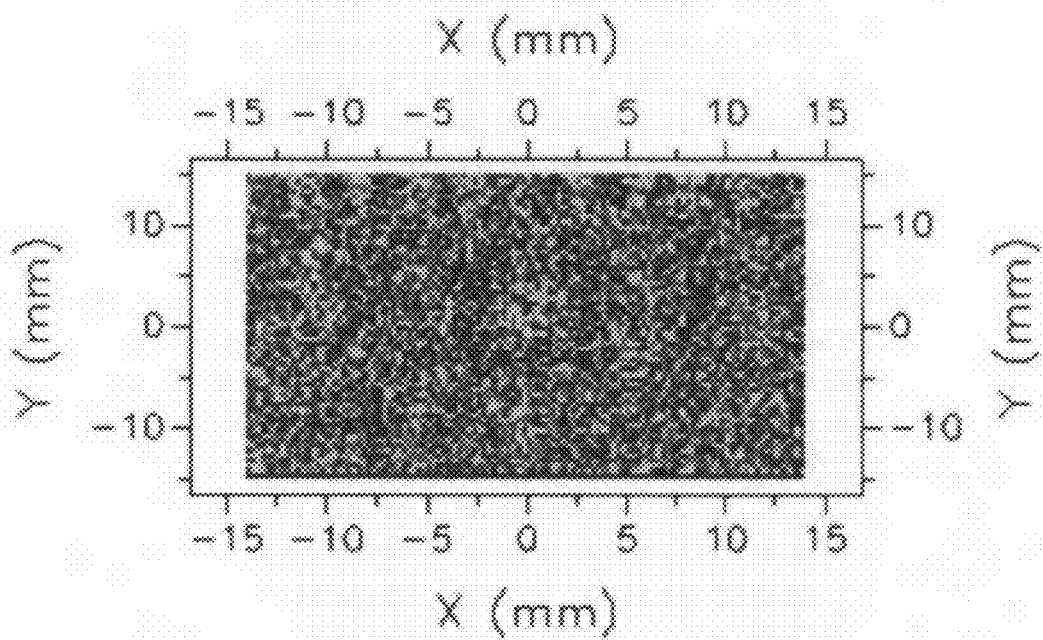
Figure 10C:
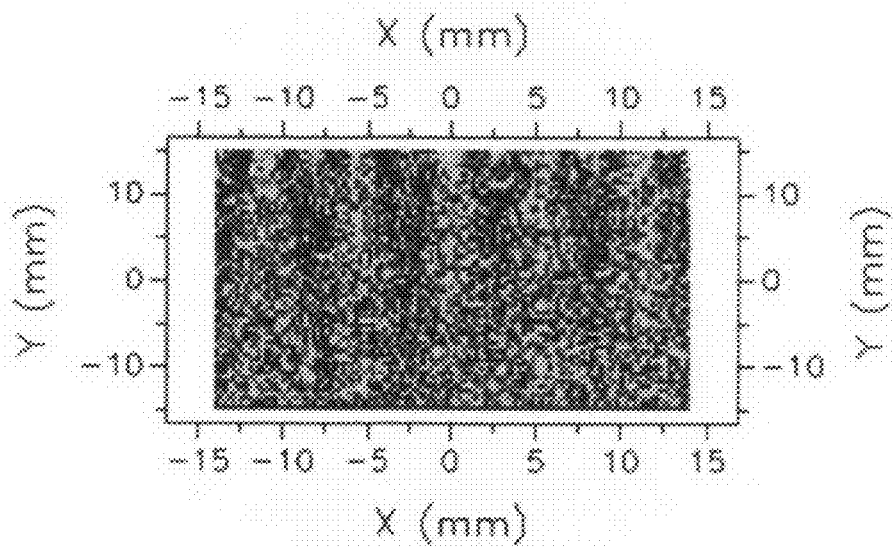
Figure 11:
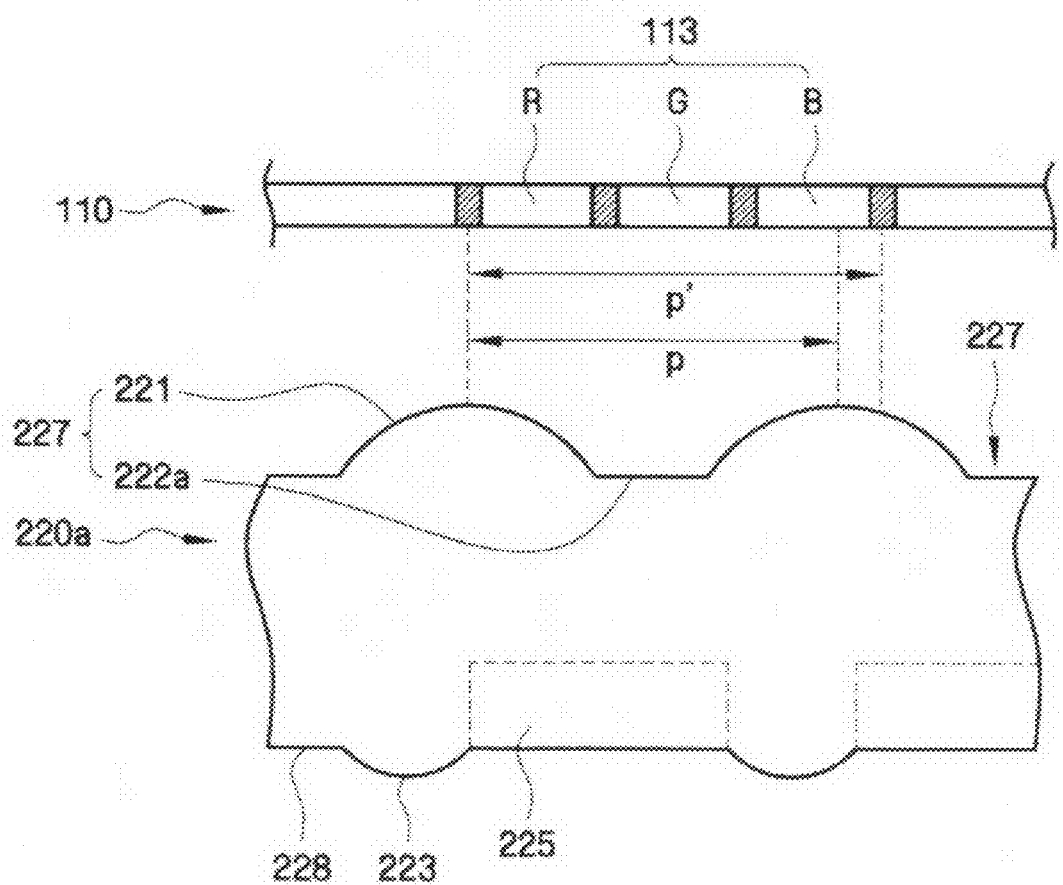
FIG. 11 illustrates a diagram of the relationship between the pitch of first protrusions of the light guiding plate of the exemplary embodiment of FIGS. 2A through 2D and the pitch of pixels of a display panel.
Figure 12:
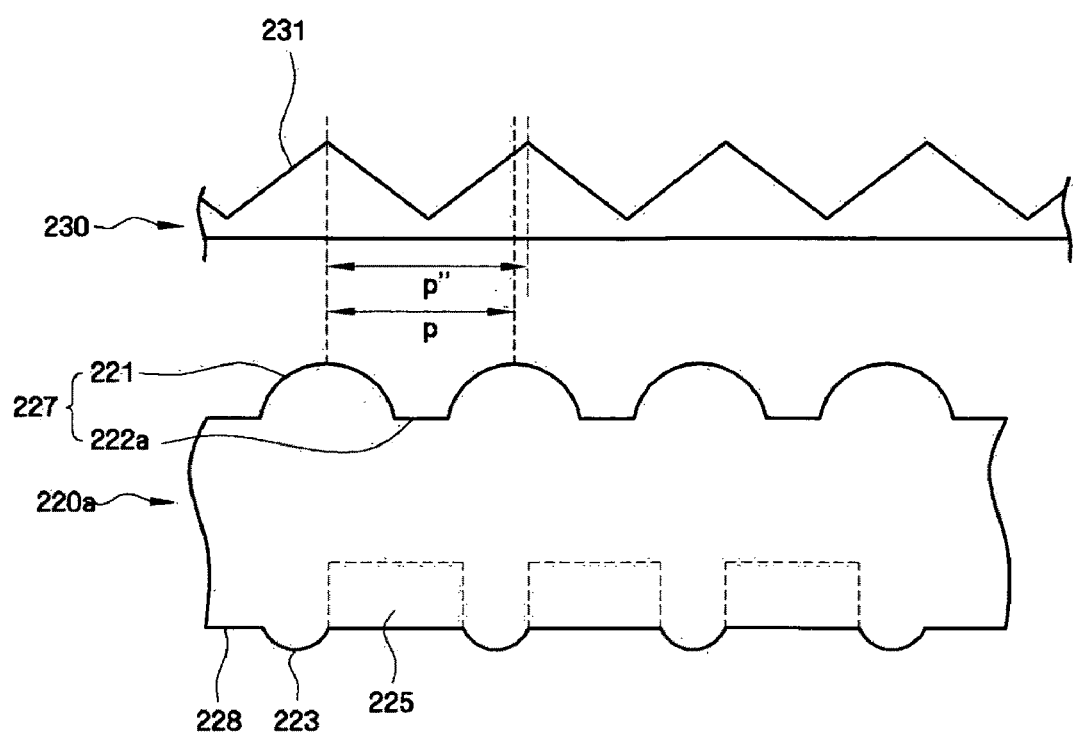
FIG. 12 illustrates a diagram of the relationship between the pitch of the first protrusions of the light guiding plate of the exemplary embodiment of FIGS. 2A through 2D and the pitch of prism patterns on a prism sheet.

FIGS. 10A through 10C illustrate color-coded diagrams of computer simulation results of the luminance properties of the light guiding plate 220a of the embodiment of FIGS. 2A through 2D, FIG. 11 illustrates a diagram of the relationship between the pitch p of the first protrusions 221 of the light guiding plate 220a and a pitch p' of pixels 113 of a display panel 110, and FIG. 12 illustrates a diagram of the relationship between the pitch p and a pitch p'' between a pair of adjacent prism patterns 231 on a prism sheet 230.

FIGS. 10A through 10C illustrate spatial luminance charts of computer simulation results obtained by simulating, with the aid of a light tool, luminance deviations resulting from varying the ratio (w:d) of the width w of the first protrusions 221 and the width d of the spacing portions 222a from 10:1 to 10:2 and from 10:2 to 10:5. More specifically, FIGS. 10A through 10C illustrate diagrams of luminance distributions in an area near the light receiving surface 224 of the light guiding plate 220a for different ratios of the width w of the first protrusions 221 and the width d of the spacing portions 222a. The luminance distribution of FIG. 10A is more uniform than the luminance distribution of FIG. 10B or 10C. That is, referring to the luminance distribution of FIG. 10A, dark portions and bright portions are uniformly distributed, rather than being concentrated in certain areas. Referring to Table 1 below, as the ratio of the width w of the first protrusions 221 and the width d of the spacing portions 222a increases, a luminance deviation R (per unit distance) decreases, i.e., luminance uniformity increases.

TABLE 1

| | w:d | | |
|---|---|---|---|
| | 10:1 | 10:2 | 10:5 |
| Luminance Deviation R | 7.828548 | 8.740752 | 11.63732 |

Referring to FIG. 11, the display panel 110 includes a plurality of pixels 113. Each of the pixels 113 has red (R), green (G), and blue (B) cells. In order to reduce noise caused by optical interference, the pitch p of protrusions 221 may be less than rather than the same as the pitch p' of the pixel areas, i.e., the width of the adjacent pixels 113. Since each of the pixels 113 has R, G and B cells, the pitch p' may be the same as the width of R, G and B cells combined.

Referring to FIG. 12, in order to reduce noise caused by optical interference, the pitch p may be less than or the same as the pitch p" of the prism patterns on a corresponding prism sheet 230.

Figure 13A:
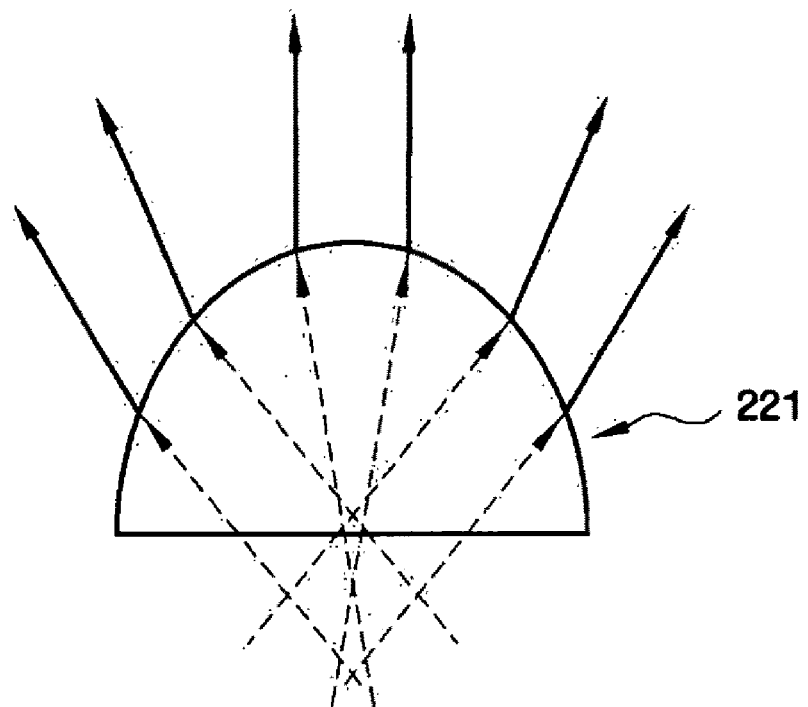
FIG. 13A illustrates a diagram of an optical phenomenon that occurs in a first protrusion of the light guiding plate of the exemplary embodiment of FIGS. 2A through 2D.

FIG. 13A illustrates a diagram of an optical phenomenon that occurs in a first protrusion 221 of the light guiding plate 220a of the exemplary embodiment of FIGS. 2A through 2D, and FIG. 13B illustrates a diagram of an optical phenomenon that occurs in a first protrusion 221d of a light guiding plate according to a comparative example. FIGS. 14A through 14C illustrate color-coded computer simulation results of the optical properties of light guiding plates 200 having different shapes of first protrusions 221 as shown in the respective figures.

Referring to FIG. 2A, part of light incident upon the light guiding plate 220a through the light receiving surface 224 collides with the reflection surfaces 226 of the reflection patterns 225 and thus travels toward the light emission surface 227 of the light guiding plate 220a. Then, the light is refracted by passing through the first protrusions 221. Thereafter, the refracted light is emitted. In this manner, it is possible to emit a considerable amount of light toward the front of the light emissions surface 227 of the light guiding plate 220a.

Figure 13B:
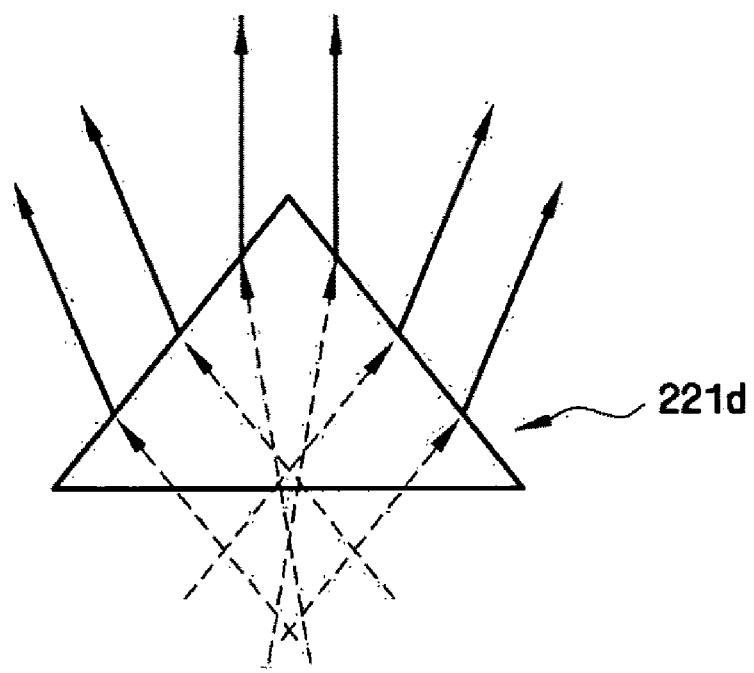
FIG. 13B illustrates a diagram of an optical phenomenon that occurs in a first protrusion of a light guiding plate according to a comparative example.
Figure 14A:
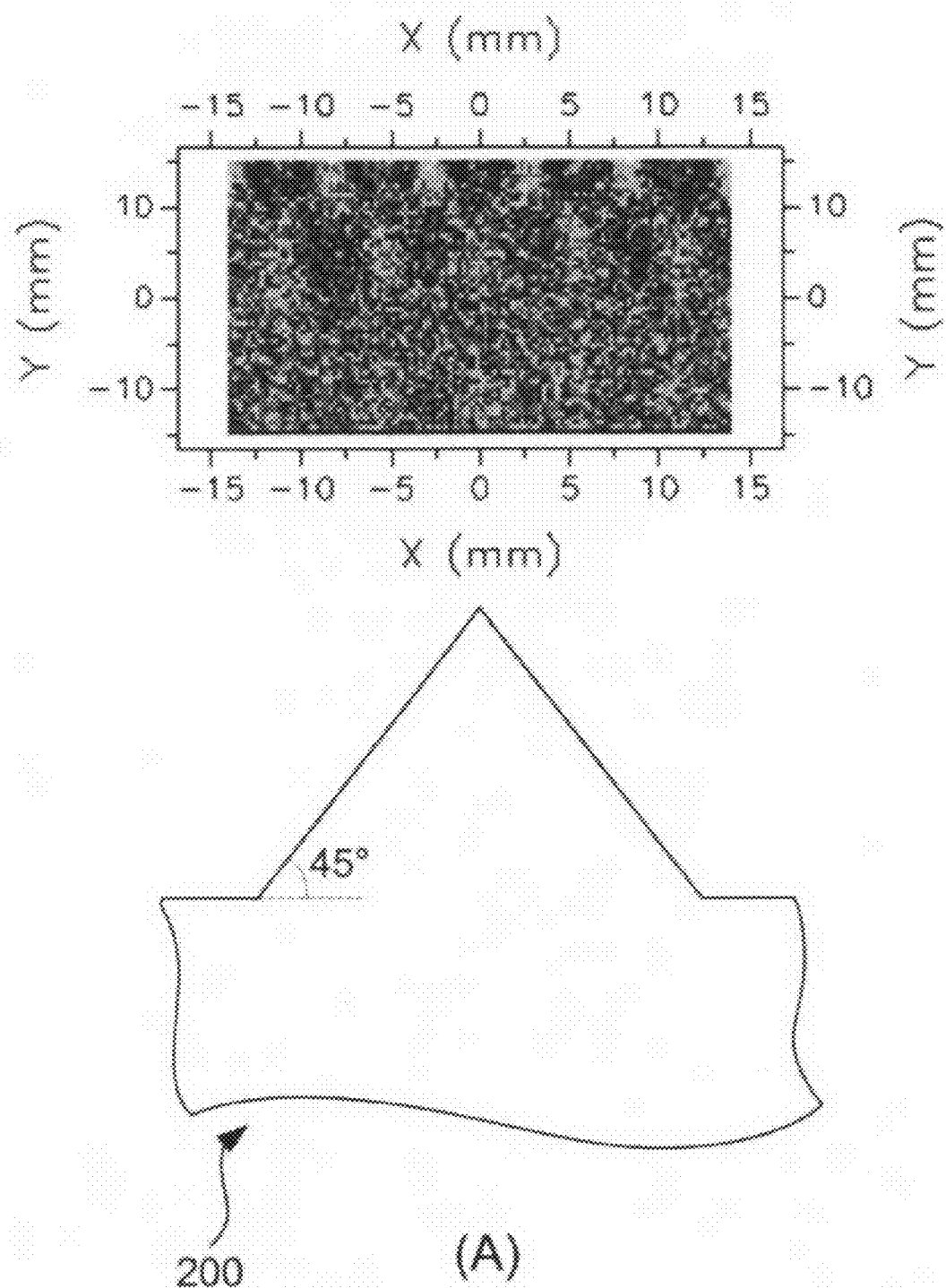
FIGS. 14A through 14C illustrate color-coded diagrams of computer simulation results of the optical properties of light guiding plates having different shapes of first protrusions.
Figure 14B:
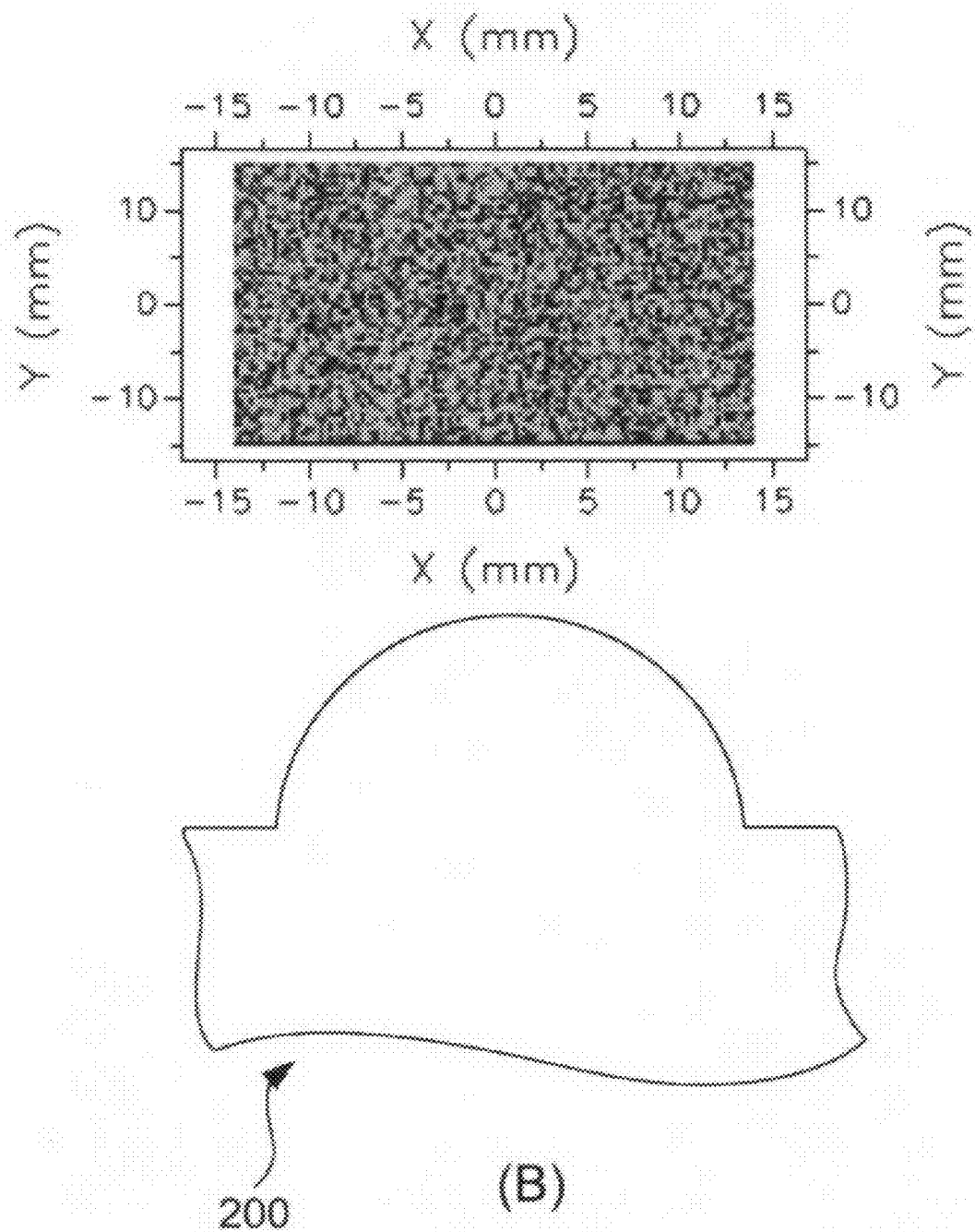
Figure 14C:
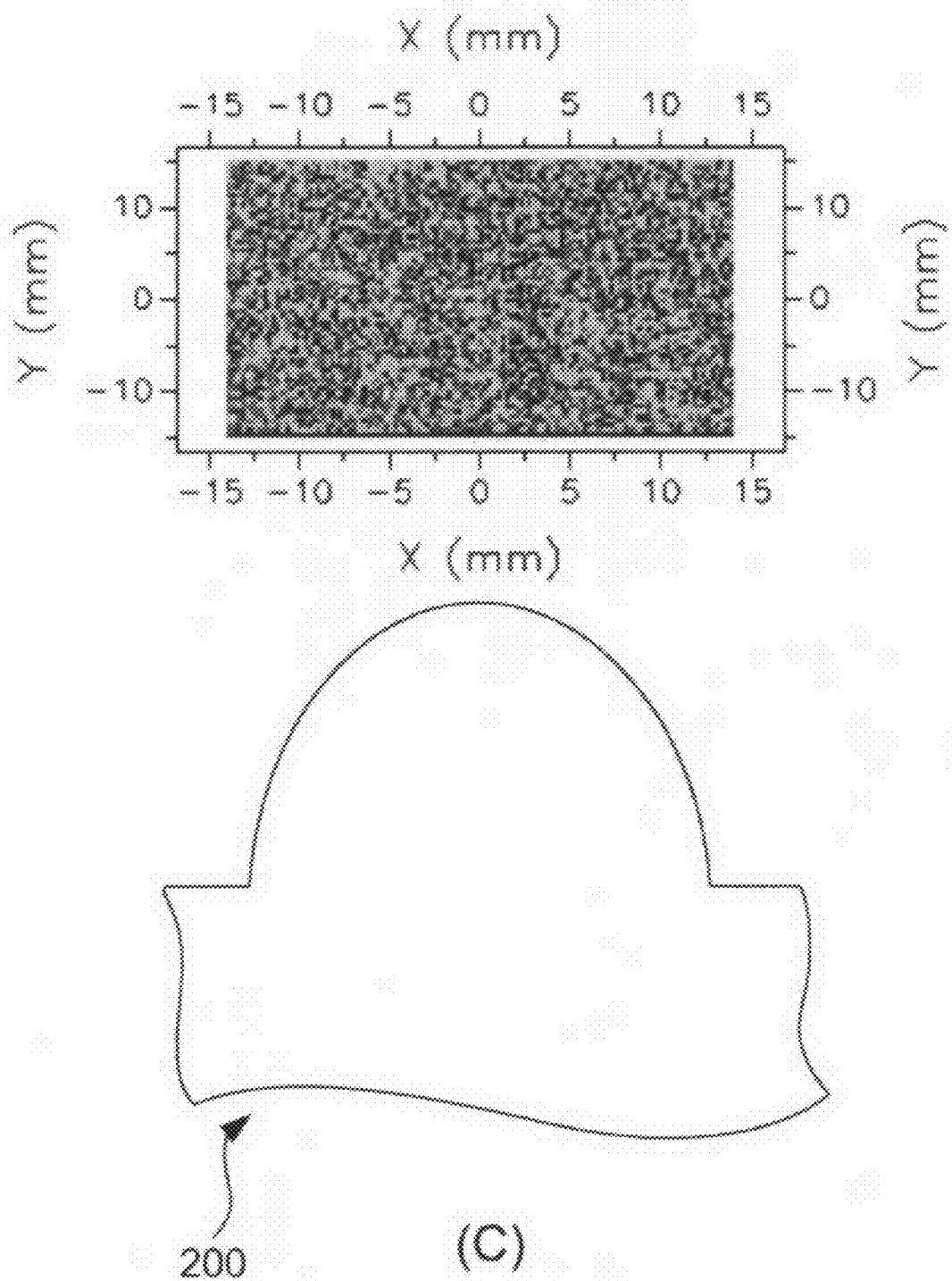

Referring to FIGS. 13A and 13B, a first protrusion 221 whose cross-section has the shape of a partial circle or a partial ellipse can disperse light more widely than a first protrusion 221d whose cross-section has the shape of a triangle. Thus, the first protrusion 221 is more suitable than the first protrusion 221d for use in an optical mixing operation and can provide more excellent luminance uniformity properties than the first protrusion 221d.

FIGS. 14A through 14C illustrate color-coded spatial luminance charts of computer simulation results obtained by simulating the luminance uniformity properties, along an XY plane, of a light guiding plate 200 having triangular first protrusions (A), a light guiding plate 200 having semicircular first protrusions (B), and a light guiding plate 200 having semi-elliptical first protrusion (C) using a light tool. Upon comparing the spatial luminance charts of FIGS. 14A through 14C, it is recognized that bright portions and dark portions are more uniformly distributed in the light guiding plate 200 of FIG. 14A than in the light guiding plate 200 of FIG. 14B or 14C. This becomes more apparent by referencing Table 2 below.

TABLE 2

| | Cross-Sectional Shape | | |
|---|---|---|---|
| | Triangle (A) | Semicircle (B) | Semi-ellipse (C) |
| Luminance Deviation R' | 9.648759 | 8.363411 | 7.70808 |

Referring to Table 2, a luminance deviation R' (per unit length) is about 9.65 for the triangular first protrusions (A), about 8.36 for the semicircular first protrusions (B), and about 7.71 for the semi-elliptical first protrusions (C). That is, referring to Table 2, the luminance deviation R' is lower when the first protrusions 221 have a round cross-section, like the semicircular first protrusions (B) or the semi-elliptical first protrusions (C), than when the first protrusions 221 have an angular cross-section, like the triangular first protrusions (A). In addition, the luminance deviation R' is lower when the first protrusions 221 have a cross-section of the shape of a partial ellipse, like the semi-elliptical first protrusions (C), than when the first protrusions 221 have a cross-section of the shape of a partial circle, like the semicircular first protrusions (B). That is, when the first protrusions 221 have a cross-section of the shape of a partial ellipse, the first protrusions 221 can provide high luminance uniformity. Therefore, it is possible for the light guiding plate 220 of the LCD device 1 to provide high luminance uniformity without requiring optical sheets such as a diffusion sheet or a prism sheet and to decrease a hot spot phenomenon even when using an LED as a light source.

According to the present disclosure of invention, a plurality of protruding patterns having a cross-section of the shape of a partial ellipse are formed on a light emission surface of a light guiding plate. Thus, it is possible to achieve excellent optical properties without requiring additional optical processing sheets. In addition, since the here disclosed concepts are is suitable for application to optical mixing operations other than just those used in LCD backlighting, it is possible to use the disclosed light guiding plates to decrease the hot spot phenomenon in other applications.

While the here-disclosed inventive concepts have been particularly shown and described with reference to exemplary embodiments, it will be understood by those of ordinary skill in the art from the above that various changes in form and details may be made therein without departing from the spirit and scope of the present disclosure.

What is claimed is:

1. A display device comprising:
   a display panel;
   an edge lighting source; and
   a light guiding plate which guides light generated by the edge lighting source to the display panel, the light guiding plate comprising an edge light receiving surface upon which the light generated by the edge lighting source is incident, a first surface which is adjacent to the edge light receiving surface and on which a plurality of first protrusions that extend in a first direction are formed, and a second surface which faces the first surface and on which a plurality of second protrusions are formed, wherein the first protrusions comprise a cross-section of the shape of a partial ellipse along a plane perpendicular to the first direction, the ellipse having a minor axis parallel to the first surface and a major axis perpendicular to the first surface.

2. The display device of claim 1, wherein the light guiding plate further comprises a plurality of spacing portions which are formed between the first protrusions, and the first protrusions are elongated and formed in parallel with each other.

3. The display device of claim 2, wherein the spacing portions have at least one of a flat surface, a protruding surface, and a recessed surface.

4. A display device comprising:
a display panel;
a light source; and
a light guiding plate which guides light generated by the light source to the display panel, the light guiding plate comprising a light receiving surface upon which the light generated by the light source is incident, a first surface which is adjacent to the light receiving surface and on which a plurality of first protrusions that extend in a first direction are formed, and a second surface which faces the first surface and on which a plurality of second protrusions are formed, wherein the first protrusions comprise a cross-section of the shape of a partial ellipse along a plane perpendicular to the first direction, the ellipse having a minor axis parallel to the first surface and a major axis perpendicular to the first surface, and wherein the spacing portions have a cross-section of the shape of a partial circle along the plane perpendicular to the first direction.

5. The display device of claim 4, wherein the ellipse has a minor axis radius a and a major axis radius and the circle has a radius r, the minor axis radius a and the radius r satisfying the following relation: $r<a$.

6. The display device of claim 5, wherein the height of the first protrusions from an imaginary horizontal surface plane is greater than the height of the spacing portions from the imaginary horizontal surface plane.

7. The display device of claim 2, wherein one or more first protrusions are formed between a pair of adjacent spacing portions and one or more spacing portions are formed between a pair of adjacent first protrusions.

8. The display device of claim 2, wherein spacing portions that are formed in the vicinity of the light receiving surface have at least one of a protruding surface and a recessed surface and other spacing portions have a flat surface.

9. The display device of claim 2, wherein the width of the spacing portions is less than one fifth of the width of the first protrusions.

10. The display device of claim 1, wherein the ellipse has a minor axis radius a and a major axis radius b, the minor axis radius a and the major axis radius b satisfying the following relation: $1<b/a<4$.

11. A display device comprising:
a display panel;
a light source; and
a light guiding plate which guides light generated by the light source to the display panel, the light guiding plate comprising a light receiving surface upon which the light generated by the light source is incident, a first surface which is adjacent to the light receiving surface and on which a plurality of first protrusions that extend in a first direction are formed, and a second surface which faces the first surface and on which a plurality of second protrusions are formed, wherein the first protrusions comprise a cross-section of the shape of a partial ellipse along a plane perpendicular to the first direction, the ellipse having a minor axis parallel to the first surface and a major axis perpendicular to the first surface, and wherein the light guiding plate further comprises a plurality of triangular patterns which are formed on the first surface in parallel with the first protrusions and have a cross-section of the shape of a triangular prism along a plane perpendicular to the first direction.

12. The display device of claim 11, wherein the first protrusions are formed on portions of the first surface which are adjacent to either lateral surface of the light guiding plate that is perpendicular to the light receiving surface, the first surface and the second surface and the triangular patterns are formed between the first protrusions in parallel with the first protrusions.

13. The display device of claim 12, wherein the sum of the widths of first protrusions on one side of the light guiding plate is two or more times greater than the thickness of the light guiding plate.

14. The display device of claim 11, wherein the triangular patterns and the first protrusions are alternately arranged in parallel with each other.

15. The display device of claim 1, wherein the display panel comprises a plurality of pixels and a pitch of the first protrusions is less than or the same as a pitch of the pixels.

16. The display device of claim 1, further comprising a prism sheet which is formed between the light guiding plate and the display panel and on which a plurality of prism patterns are formed, wherein a pitch of the first protrusions is less than a pitch of the prism patterns.

17. The display device of claim 1, wherein the light guiding plate further comprises one or more reflection patterns which are formed among the second protrusions and comprise at least one reflection surface that faces the light receiving surface.

18. The display device of claim 1, wherein the second protrusions extend in the same direction as the first protrusions in parallel with the first protrusions.

19. The display device of claim 1, wherein the light source is a point light source.

20. A light guiding plate comprising:
a light receiving minor surface;
a major first surface which is adjacent to the light receiving minor surface and on which a plurality of first protrusions that extend in a direction perpendicular to the light receiving surface are formed;
a major second surface which faces the first surface and on which a plurality of second protrusions are formed, wherein at least the protrusions of a first subset comprised of plural ones of the first protrusions each have a cross-section of the shape of a corresponding first partial ellipse along a plane parallel to the light receiving minor surface, the ellipse having a minor axis parallel to the first surface and a major axis perpendicular to the first surface.

21. The light guiding plate of claim 20, further comprising a plurality of spacing portions which are formed between the first protrusions, and the first protrusions are formed in parallel with each other.

22. The light guiding plate of claim 21, wherein the width of the spacing portions is less than one fifth of the width of the first protrusions.

23. The light guiding plate of claim 20, wherein the ellipse has a minor axis radius a and a major axis radius b, the minor axis radius a and the major axis radius b satisfying the following relation: $1<b/a<4$.

24. The light guiding plate of claim 20, further comprising one or more reflection patterns which are formed among the second protrusions and comprise at least one reflection surface that faces the light receiving surface.

25. The light guiding plate of claim 20, wherein the second protrusions extend in the same direction as the first protrusions in parallel with the first protrusions.

26. A light guiding plate comprising:
   a light receiving minor surface;
   a first major surface which is adjacent to the light receiving minor surface;
   a plurality of first protrusions formed on the first major surface, the plurality of first protrusions extending in a direction perpendicular to the light receiving minor surface, the plurality of first protrusions being elongated and formed in parallel with each other;
   a plurality of spacing portion formed between the first protrusions on the first major surface;
   a second major surface which faces the first surface and on which a plurality of second protrusions are formed,
   wherein the first protrusions have a cross-section of the shape of a partial ellipse along a plane parallel to the light receiving minor surface, the ellipse having a minor axis parallel to the first surface and a major axis perpendicular to the first major surface, and
   wherein the spacing portions have a cross-section of the shape of a partial circle along the plane parallel to the light receiving minor surface.

27. The light guiding plate of claim 26, wherein the ellipse has a minor axis radius a and a major axis radius b and the circle has a radius r, the minor axis radius a and the radius r satisfying the following relation: $r<a$.

28. The light guiding plate of claim 27, wherein the height of the first protrusions from an imaginary horizontal surface plane is greater than the height of the spacing portions from the imaginary horizontal surface plane.

29. A light guiding plate comprising:
   a light receiving minor surface;
   a first major surface which is adjacent to the light receiving minor surface;
   a plurality of first protrusions formed on the first substrate, the plurality of first protrusions extending in a direction perpendicular to the light receiving minor surface, the plurality of first protrusions being elongated and formed in parallel with each other;
   a plurality of triangular patterns which are formed on the first major surface in parallel with the first protrusions and have a cross-section of the shape of a triangular prism along a plane perpendicular to the first direction;
   a second major surface which faces the first major surface and on which a plurality of second protrusions are formed;
   wherein the first protrusions have a cross-section of the shape of a partial ellipse along a plane parallel to the light receiving minor surface, the ellipse having a minor axis parallel to the first surface and a major axis perpendicular to the first major surface.

30. A light guiding plate of claim 29, wherein the first protrusions are formed on portions of the first major surface which are adjacent to another lateral minor surface of the light guiding plate, that other lateral minor surface being perpendicular to the light receiving minor surface, to the first major surface and to the second major surface where the triangular patterns are formed between the first protrusions in parallel with the first protrusions.

31. A light guiding plate of claim 30, wherein the sum of the widths of first protrusions on one side of the light guiding plate is two or more times greater than the thickness of the light guiding plate.

32. A light guiding plate of claim 29, wherein the triangular patterns and the first protrusions are alternately arranged in parallel with each other.

* * * * *